(12) United States Patent
Tran

(10) Patent No.: US 12,240,549 B1
(45) Date of Patent: Mar. 4, 2025

(54) TOWABLE TRAILER SYSTEMS

(71) Applicant: Khoa Van Tran, San Antonio, TX (US)

(72) Inventor: Khoa Van Tran, San Antonio, TX (US)

( * ) Notice: Subject to any disclaimer, the term of this patent is extended or adjusted under 35 U.S.C. 154(b) by 140 days.

(21) Appl. No.: 17/707,755

(22) Filed: Mar. 29, 2022

Related U.S. Application Data

(60) Provisional application No. 63/168,861, filed on Mar. 31, 2021.

(51) Int. Cl.
*B62D 63/08* (2006.01)

(52) U.S. Cl.
CPC .................. *B62D 63/08* (2013.01)

(58) Field of Classification Search
CPC .. B62D 63/064; B62D 63/065; B62D 63/062; B62D 63/08; B62D 33/0207; B62D 33/02; B62D 27/06; B62D 21/09; B62D 63/061; B62D 21/20; G01G 19/08
See application file for complete search history.

(56) References Cited

U.S. PATENT DOCUMENTS

| | | | | |
|---|---|---|---|---|
| 2,456,013 A | * | 12/1948 | Witt | B62D 63/061 296/181.7 |
| 2,457,397 A | * | 12/1948 | Richards | B62D 63/061 280/80.1 |
| 2,720,413 A | * | 10/1955 | Halverson | B62B 1/208 296/10 |
| 2,806,710 A | * | 9/1957 | Mascaro | B62D 53/065 280/43.23 |
| 2,809,046 A | * | 10/1957 | Andersson | B60R 9/06 296/26.11 |

(Continued)

FOREIGN PATENT DOCUMENTS

| | | |
|---|---|---|
| KR | 100858866 B1 | 9/2008 |
| WO | 1999007595 A1 | 2/1999 |

OTHER PUBLICATIONS

Hand Trailer Winch, Owner's Manual and Safety Instructions, Haulmaster, Aug. 14, 2013.

(Continued)

*Primary Examiner* — Timothy Wilhelm
(74) *Attorney, Agent, or Firm* — Volk & McElroy, LLP; Michael D. Volk, Jr.

(57) ABSTRACT

A towable trailer system includes a trailer vehicle and a cargo bin removably coupled to the trailer vehicle. The trailer vehicle includes a hitch connecting assembly having a first elongate member, a hitch coupler coupled to the first elongate member, and a tubular mount coupled to the first elongate member. A main body assembly is removably coupled to the hitch connecting assembly and having a pair of wheel assemblies movably supporting the trailer vehicle on a surface, and a second elongate member removably coupled to the first elongated member. A first cross bar coupled to the second elongate member extends substantially perpendicularly to the second elongate member, and a second cross bar is removably coupled to the pair of wheel assemblies. A third elongate member extends from the second crossbar to the second elongate member. The cargo bin includes a cargo bin receiver removably engaged with the tubular mount.

13 Claims, 31 Drawing Sheets

(56) References Cited

U.S. PATENT DOCUMENTS

| | | | | |
|---|---|---|---|---|
| 2,835,400 A | * | 5/1958 | Latzke | B60P 3/1033 |
| | | | | 280/43.11 |
| 2,969,989 A | * | 1/1961 | Struthers | B60P 1/025 |
| | | | | 280/43.11 |
| 2,977,010 A | * | 3/1961 | Okey | B60P 3/1041 |
| | | | | 296/26.06 |
| 2,978,275 A | * | 4/1961 | Williams | B62D 63/061 |
| | | | | 280/80.1 |
| 3,266,836 A | * | 8/1966 | Taylor | B60P 3/105 |
| | | | | 410/91 |
| 3,400,944 A | | 9/1968 | Narcisse | |
| 3,458,073 A | | 7/1969 | Dawson | |
| 3,584,753 A | * | 6/1971 | Voeller | B60P 3/105 |
| | | | | 414/494 |
| 3,620,397 A | * | 11/1971 | Gagnon | B60P 3/07 |
| | | | | 298/5 |
| 3,863,594 A | | 2/1975 | Gawthrop | |
| 3,909,057 A | * | 9/1975 | Guthry | B60P 3/1041 |
| | | | | 296/157 |
| 3,913,934 A | * | 10/1975 | Koehn | B62D 53/067 |
| | | | | D12/101 |
| D240,807 S | | 8/1976 | Floodeen | |
| 3,989,264 A | * | 11/1976 | Lovendahl | B60P 3/1033 |
| | | | | 280/401 |
| D243,597 S | | 3/1977 | Headington | |
| 4,060,259 A | * | 11/1977 | Mefferd | A01B 73/005 |
| | | | | 280/43.23 |
| 4,126,324 A | * | 11/1978 | Browning | B62D 63/061 |
| | | | | 296/10 |
| 4,154,352 A | | 5/1979 | Fowler | |
| 4,168,093 A | * | 9/1979 | Dysthe | B62D 63/064 |
| | | | | 296/10 |
| 4,175,768 A | * | 11/1979 | Thackray | B62D 63/064 |
| | | | | 280/491.2 |
| 4,239,258 A | * | 12/1980 | Burris | B60G 11/14 |
| | | | | 280/639 |
| D271,093 S | | 10/1983 | Triggs | |
| 4,480,851 A | * | 11/1984 | St-Pierre | B62D 63/061 |
| | | | | 180/209 |
| D277,086 S | | 1/1985 | Dudley | |
| 4,529,220 A | * | 7/1985 | Wright | B62D 63/061 |
| | | | | 280/767 |
| 4,621,857 A | * | 11/1986 | Jagers | B62D 63/06 |
| | | | | 280/789 |
| 4,752,177 A | | 6/1988 | Zenna | |
| 4,786,073 A | * | 11/1988 | Harper | B62D 63/061 |
| | | | | 280/491.1 |
| 4,807,894 A | * | 2/1989 | Walker | B63C 13/00 |
| | | | | 280/63 |
| 4,846,484 A | | 7/1989 | Nekola | |
| D307,732 S | | 5/1990 | Level | |
| D313,955 S | | 1/1991 | Merwe et al. | |
| D316,688 S | | 5/1991 | Barginear | |
| D322,235 S | | 12/1991 | Bell | |
| 5,161,814 A | * | 11/1992 | Walker | B60P 1/022 |
| | | | | 280/43.24 |
| 5,249,821 A | * | 10/1993 | Ricketts | B62D 63/061 |
| | | | | 280/789 |
| 5,267,746 A | | 12/1993 | Stevenson | |
| 5,340,145 A | * | 8/1994 | Leib | B62D 63/061 |
| | | | | 280/491.1 |
| 5,397,148 A | * | 3/1995 | Nelson | B60D 1/07 |
| | | | | 280/656 |
| 5,431,423 A | * | 7/1995 | Moreland, Sr. | B62D 63/061 |
| | | | | 280/80.1 |
| 5,476,274 A | * | 12/1995 | Oberlander | B60P 3/122 |
| | | | | 414/495 |
| 5,480,180 A | * | 1/1996 | Fuller | B62D 33/033 |
| | | | | 280/491.1 |
| D375,921 S | | 11/1996 | Kunkle | |
| 5,570,898 A | * | 11/1996 | Albert | B60P 3/07 |
| | | | | 280/789 |
| D403,276 S | | 12/1998 | Neault et al. | |
| D434,701 S | | 12/2000 | Patmont | |
| 6,164,679 A | * | 12/2000 | Lay | B62D 63/08 |
| | | | | 280/475 |
| 6,164,683 A | * | 12/2000 | Kalman | B60P 3/07 |
| | | | | 296/181.7 |
| 6,199,909 B1 | * | 3/2001 | Kass | B62D 63/064 |
| | | | | 280/789 |
| D443,561 S | | 6/2001 | Voogt | |
| 6,378,893 B1 | * | 4/2002 | Jager | B62D 33/033 |
| | | | | 280/401 |
| 6,428,035 B1 | | 8/2002 | Maxwell et al. | |
| 6,527,494 B2 | * | 3/2003 | Hurlburt | B60P 1/16 |
| | | | | 298/17.5 |
| 6,585,285 B2 | * | 7/2003 | Koch | B62D 63/061 |
| | | | | 280/789 |
| 6,592,139 B1 | * | 7/2003 | Shanahan | B60P 1/027 |
| | | | | 280/491.2 |
| 6,601,908 B2 | * | 8/2003 | Votruba | E05B 83/16 |
| | | | | 296/182.1 |
| 6,612,389 B1 | | 9/2003 | Bell | |
| 6,767,025 B2 | * | 7/2004 | Hagen | B62D 63/061 |
| | | | | 280/401 |
| 6,773,025 B1 | * | 8/2004 | Zelm | B62D 63/061 |
| | | | | 280/648 |
| 6,923,475 B1 | * | 8/2005 | Martin | B62D 21/20 |
| | | | | 280/789 |
| 6,955,375 B2 | | 10/2005 | Thurm | |
| 6,962,370 B2 | * | 11/2005 | Simpson | B62D 63/061 |
| | | | | 280/789 |
| 7,055,848 B1 | * | 6/2006 | James | B62K 27/02 |
| | | | | 280/401 |
| 7,073,816 B1 | * | 7/2006 | Larson | B62D 63/062 |
| | | | | 280/789 |
| 7,219,919 B2 | * | 5/2007 | Tipton | B60P 3/14 |
| | | | | 280/651 |
| D544,815 S | | 6/2007 | Williams | |
| 7,275,753 B1 | | 10/2007 | Ceccarelli et al. | |
| 7,326,022 B2 | * | 2/2008 | Brown | B62D 63/061 |
| | | | | 414/483 |
| D566,624 S | | 4/2008 | Dempsey et al. | |
| 7,374,197 B2 | * | 5/2008 | Leverett | B60D 1/143 |
| | | | | 280/411.1 |
| 7,458,602 B2 | | 12/2008 | Maxwell | |
| 7,540,528 B2 | * | 6/2009 | Spainhower | B62D 63/062 |
| | | | | 280/415.1 |
| 7,543,842 B1 | * | 6/2009 | Fiorini | B62B 3/025 |
| | | | | 280/43 |
| 7,547,025 B2 | | 6/2009 | Coates | |
| 7,665,768 B2 | * | 2/2010 | Duval | B62D 63/062 |
| | | | | 280/789 |
| 7,673,887 B2 | | 3/2010 | Hassell | |
| 7,753,395 B2 | * | 7/2010 | Goettker | B60D 1/54 |
| | | | | 280/491.4 |
| 7,810,835 B2 | * | 10/2010 | Koch | B62D 63/062 |
| | | | | 280/789 |
| 7,810,866 B2 | * | 10/2010 | Dempsey | B62D 63/062 |
| | | | | 296/173 |
| D626,461 S | | 11/2010 | Barrios et al. | |
| D626,891 S | | 11/2010 | Smith | |
| 7,909,355 B2 | * | 3/2011 | Thedford | B62D 63/061 |
| | | | | 280/789 |
| 8,016,316 B1 | | 9/2011 | Carlton | |
| D648,656 S | | 11/2011 | Crane | |
| 8,157,288 B2 | * | 4/2012 | Kapels | B60D 1/46 |
| | | | | 280/491.1 |
| 8,172,248 B2 | * | 5/2012 | Groves | B60P 1/027 |
| | | | | 280/490.1 |
| D664,072 S | | 7/2012 | Halloran | |
| 8,286,983 B2 | * | 10/2012 | Hellbusch | B60D 1/015 |
| | | | | 280/415.1 |
| 8,292,558 B2 | * | 10/2012 | Benesch | B60P 3/07 |
| | | | | 410/4 |
| 8,448,978 B2 | * | 5/2013 | Alvarino | B62D 63/067 |
| | | | | 280/638 |

(56) References Cited

U.S. PATENT DOCUMENTS

| | | | |
|---|---|---|---|
| 8,590,962 B2 * | 11/2013 | Nye | B62D 33/027 |
| | | | 296/183.1 |
| 8,651,510 B2 * | 2/2014 | Fankhauser | B60G 17/0523 |
| | | | 280/490.1 |
| 8,657,305 B1 | 2/2014 | Hassell | |
| 8,708,085 B1 * | 4/2014 | Wilson | B60D 1/143 |
| | | | 180/209 |
| D710,262 S | 8/2014 | Faye | |
| 8,857,848 B2 * | 10/2014 | Lomas | B62D 63/06 |
| | | | 280/654 |
| 8,876,140 B2 * | 11/2014 | Barnett | B60P 3/122 |
| | | | 280/401 |
| 8,985,664 B2 * | 3/2015 | Bermes | B62D 63/062 |
| | | | 410/116 |
| 9,010,784 B2 | 4/2015 | Rezania | |
| 9,050,920 B2 * | 6/2015 | Aubrey | B60P 1/027 |
| 9,056,639 B2 * | 6/2015 | Bank | B62D 63/061 |
| D737,725 S | 9/2015 | Bell | |
| 9,321,388 B2 * | 4/2016 | Barnett | B60P 3/122 |
| 9,327,632 B1 * | 5/2016 | Bartel | B60P 1/483 |
| 9,340,087 B2 * | 5/2016 | Atkinson | B62D 33/037 |
| 9,346,503 B2 * | 5/2016 | Moore | B62D 63/062 |
| D759,546 S | 6/2016 | Wyk | |
| D759,547 S | 6/2016 | Wyk | |
| 9,394,017 B2 * | 7/2016 | Kennemer | B62D 33/033 |
| 9,586,637 B2 * | 3/2017 | Kentner | B62D 63/064 |
| 9,623,778 B2 * | 4/2017 | Jarvis | B60P 1/04 |
| 9,828,051 B2 * | 11/2017 | Gray | B62D 13/025 |
| 9,932,078 B1 * | 4/2018 | Nehring | B60P 1/003 |
| 10,000,146 B2 * | 6/2018 | Vipond | B62D 33/0273 |
| 10,005,504 B2 * | 6/2018 | Tran | B60P 3/07 |
| 10,053,128 B2 * | 8/2018 | Rackleff | B62B 3/001 |
| 10,071,780 B1 * | 9/2018 | Burka | B60P 3/07 |
| 10,086,740 B2 * | 10/2018 | Heck | B60P 1/027 |
| 10,131,371 B2 * | 11/2018 | Camarco | B62B 5/0003 |
| 10,207,753 B2 * | 2/2019 | O'Marra | B60P 1/02 |
| 10,562,577 B1 * | 2/2020 | Travica | B62D 63/061 |
| 10,618,580 B2 * | 4/2020 | Kennedy | F02B 63/047 |
| 10,676,144 B2 * | 6/2020 | Barnes | B62D 63/064 |
| 10,696,504 B2 * | 6/2020 | Clark | B65G 69/24 |
| 10,752,148 B2 * | 8/2020 | Selzer | B60P 1/433 |
| 10,752,306 B2 * | 8/2020 | Nordstrom | B62D 63/061 |
| 10,787,328 B2 * | 9/2020 | Soule | B60P 1/43 |
| 10,967,921 B2 * | 4/2021 | Van Tran | B60P 3/07 |
| 10,974,555 B1 * | 4/2021 | Jaskot | B60D 1/04 |
| 11,420,696 B2 * | 8/2022 | Shockley | B62D 63/061 |
| 2003/0155748 A1 * | 8/2003 | Picard | B62D 21/20 |
| | | | 280/656 |
| 2004/0004333 A1 | 1/2004 | Riermann | |
| 2004/0123529 A1 * | 7/2004 | Wiese | E04H 3/28 |
| | | | 52/6 |
| 2004/0262882 A1 | 12/2004 | Huddleston | |
| 2005/0046167 A1 * | 3/2005 | Lin | B62D 21/12 |
| | | | 280/785 |
| 2007/0132209 A1 * | 6/2007 | Winter | B62D 63/062 |
| | | | 280/656 |
| 2007/0235985 A1 * | 10/2007 | Thompson | B60D 1/54 |
| | | | 280/491.1 |
| 2007/0246911 A1 * | 10/2007 | Shawyer | B62D 63/061 |
| | | | 280/414.1 |
| 2008/0111348 A1 * | 5/2008 | Lawson | B60D 1/143 |
| | | | 280/504 |
| 2009/0212515 A1 * | 8/2009 | Oyasaeter | B62D 63/061 |
| | | | 280/40 |
| 2010/0038883 A1 * | 2/2010 | Thedford | B60P 3/07 |
| | | | 280/490.1 |
| 2011/0038699 A1 | 2/2011 | Nguyen | |
| 2011/0163523 A1 * | 7/2011 | Smith | B60D 1/66 |
| | | | 280/763.1 |
| 2014/0015223 A1 * | 1/2014 | Banwart | B62D 53/0821 |
| | | | 280/476.1 |
| 2014/0312593 A1 * | 10/2014 | Bank | B62D 63/061 |
| | | | 280/400 |
| 2015/0016930 A1 | 1/2015 | Barnett | |
| 2018/0178605 A1 * | 6/2018 | Comeaux | B62D 21/20 |
| 2018/0265143 A1 | 9/2018 | Tran | |
| 2018/0272825 A1 * | 9/2018 | Eagleton | B60P 3/0255 |
| 2018/0346042 A1 * | 12/2018 | Elliott | B62D 63/064 |
| 2020/0346700 A1 * | 11/2020 | Nordstrom | B60D 1/06 |
| 2021/0114564 A1 * | 4/2021 | Fischer | B60S 9/04 |
| 2022/0126935 A1 * | 4/2022 | Yoder | B62D 65/024 |

OTHER PUBLICATIONS

Stinger Trailer, Motorcycletrailer.com, Internet publication, Aug. 9, 2015, available at https://web.archive.org/web/20150709044158/http://www.motorcycletrailer.com/nav/carry1.html.

* cited by examiner

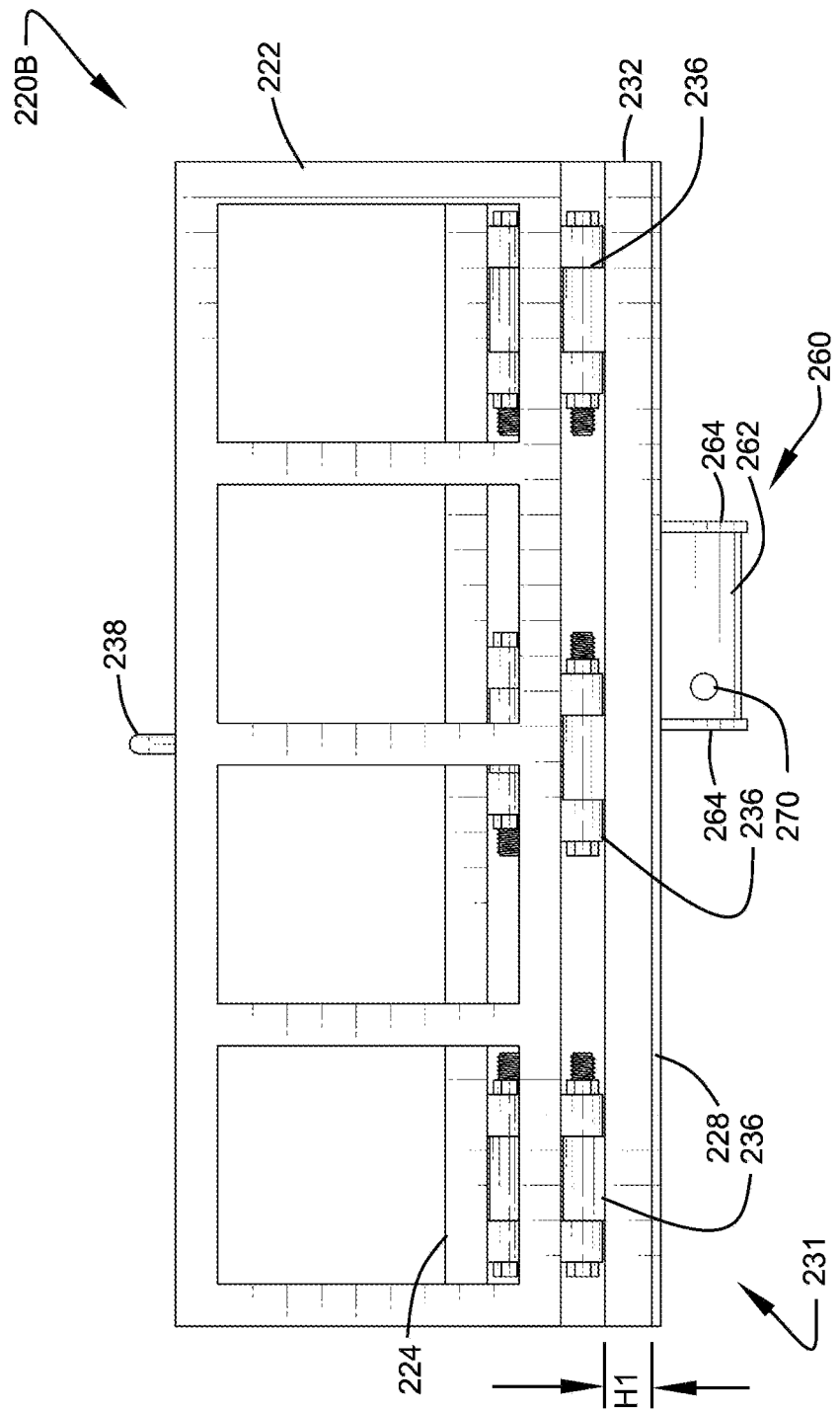

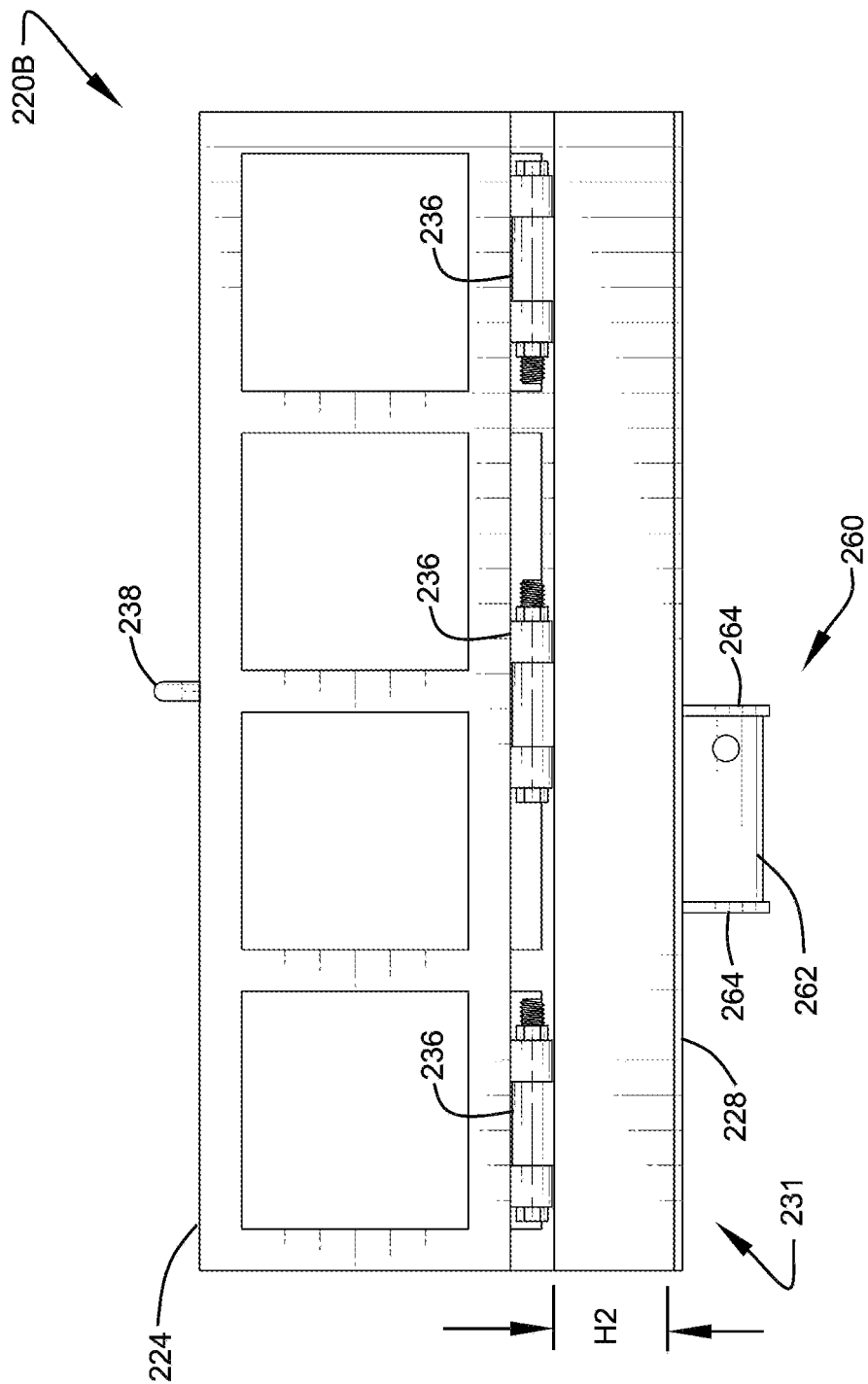

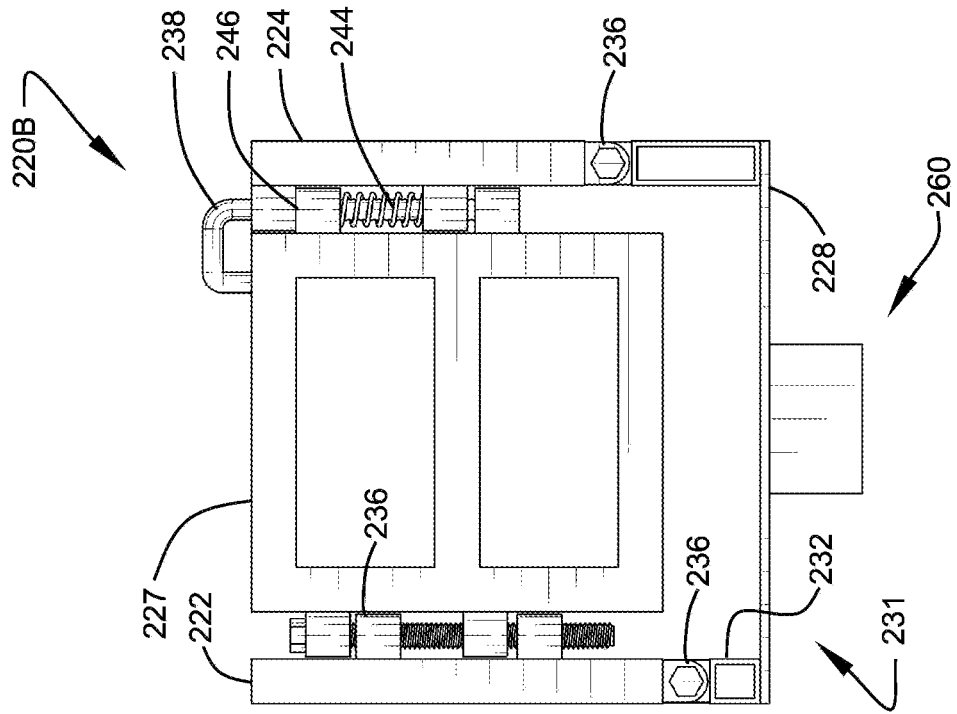

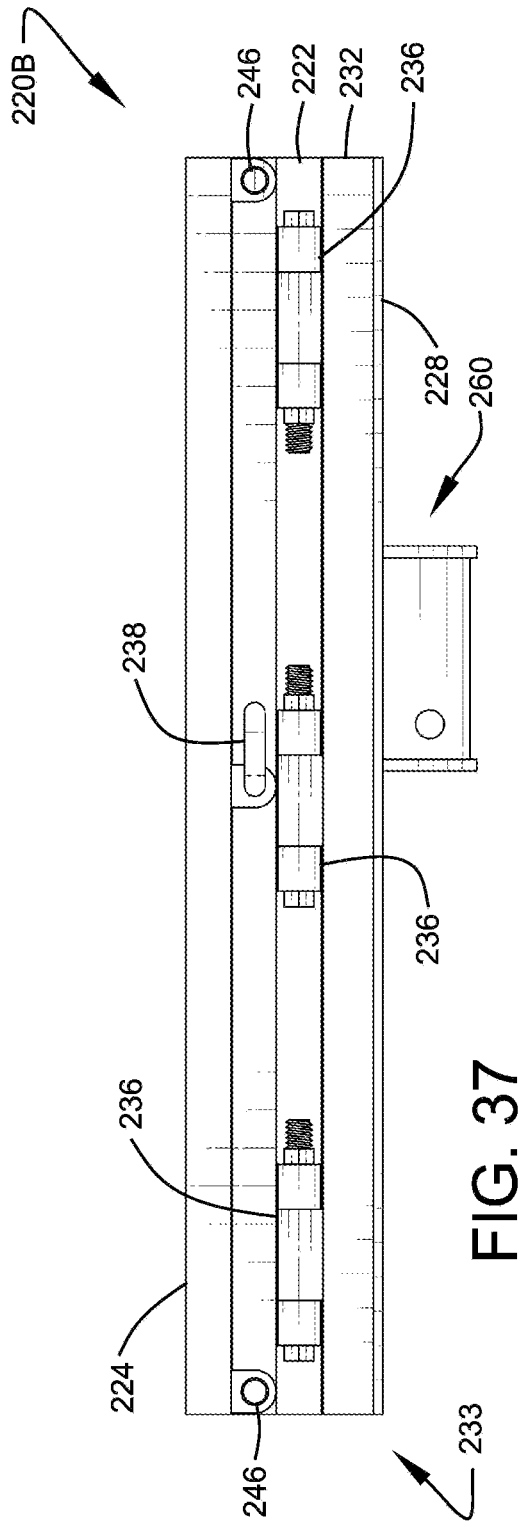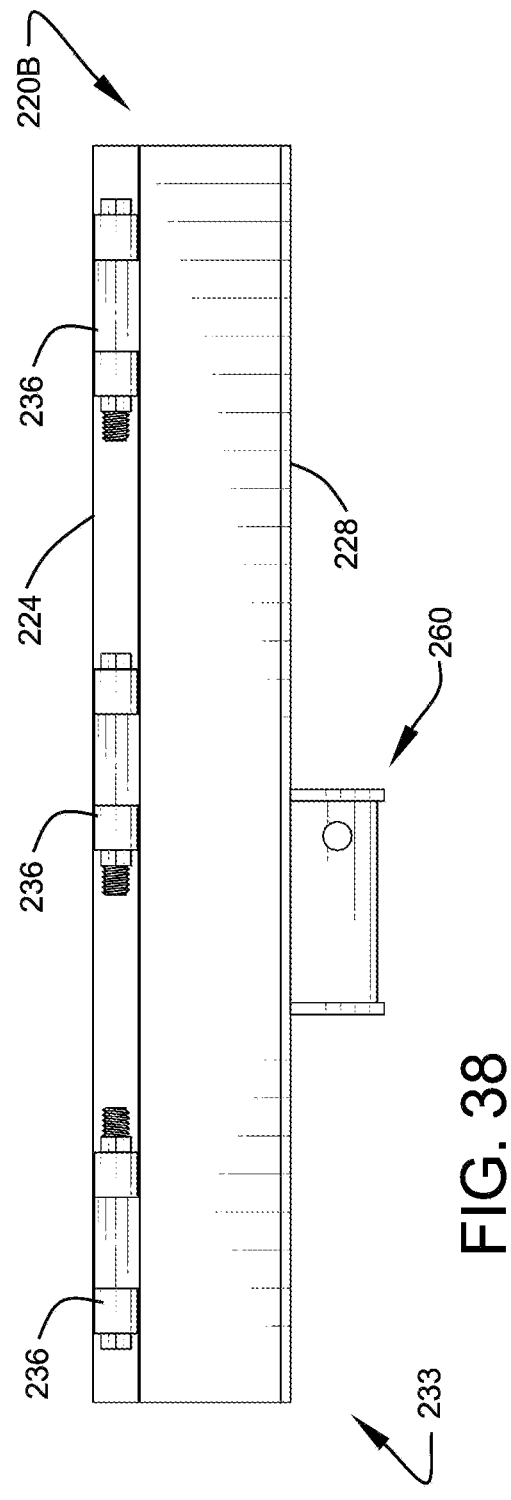

TOWABLE TRAILER SYSTEMS

CROSS REFERENCE TO RELATED APPLICATIONS

This application claims the benefit of U.S. Provisional Application No. 63/168,861, filed Mar. 31, 2021.

BRIEF DESCRIPTION OF THE DRAWINGS

FIG. 30 shows a front view of the second collapsible cargo bin of FIG. 11.

FIG. 31 shows a rear view of the second collapsible cargo bin of FIG. 11.

FIG. 32 shows a left-side view of the second collapsible cargo bin of FIG. 11.

FIG. 33 shows a right-side view of the second collapsible cargo bin of FIG. 11.

FIG. 37 shows a front view of the second collapsible cargo bin of FIG. 11 in the collapsed configuration.

FIG. 38 shows a rear view of the second collapsible cargo bin of FIG. 11 in the collapsed configuration.

DETAILED DESCRIPTION

Figure 1:
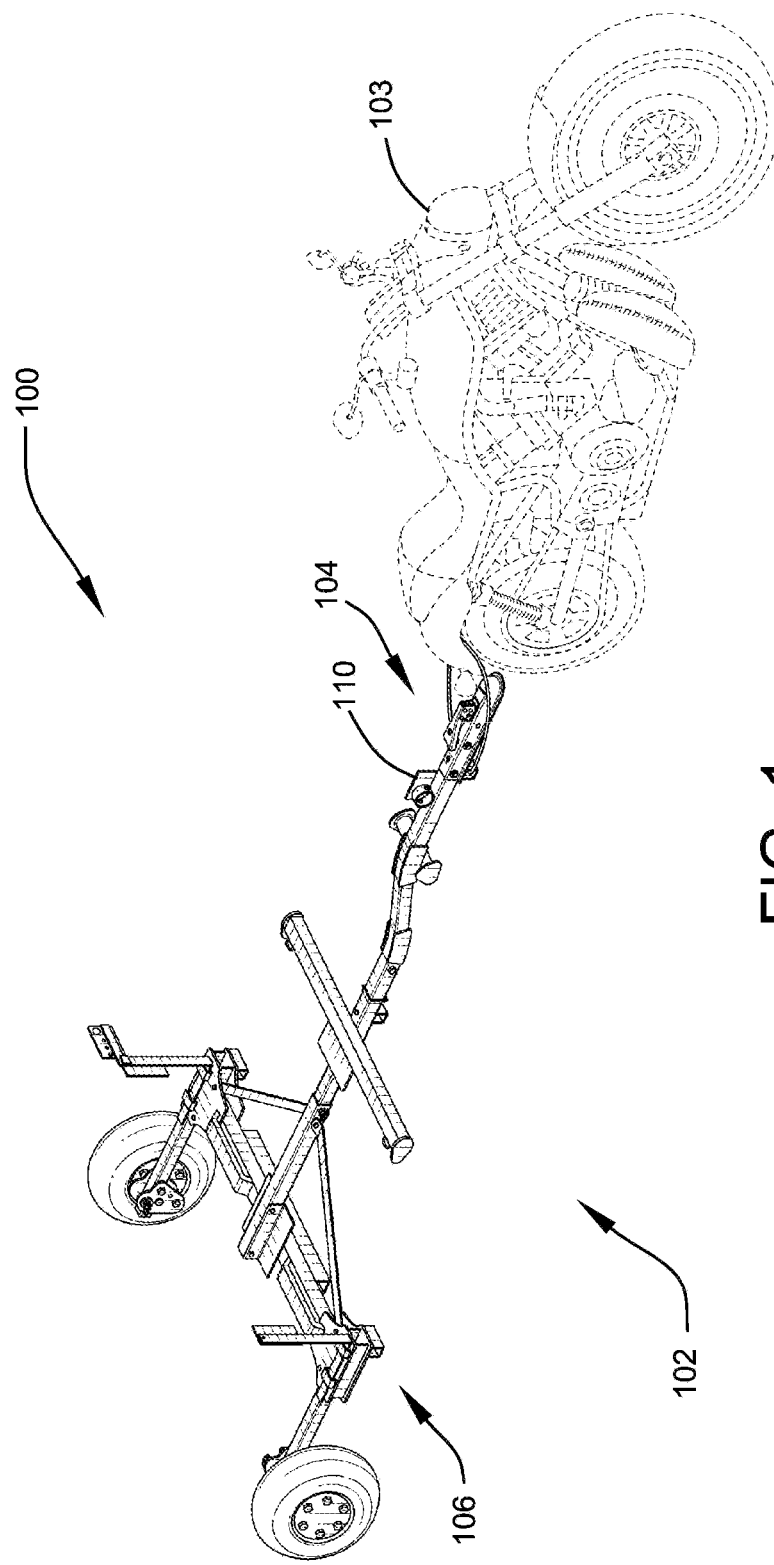
FIG. 1 shows a perspective view of a towable trailer system of the present disclosure.

The present disclosure pertains to a towable trailer system. More particularly, the present disclosure pertains to a towable trailer system having trailer vehicle adapted to be removably attached to a towing vehicle and a cargo bin removably engaged to the trailer vehicle.

Example implementations are described below with reference to the accompanying drawings. Unless otherwise expressly stated in the drawings, the sizes, positions, etc., of components, features, elements, etc., as well as any distances therebetween, are not necessarily to scale, and may be disproportionate and/or exaggerated for clarity.

The terminology used herein is for the purpose of describing example implementations only and is not intended to be limiting. As used herein, the singular forms "a," "an" and "the" are intended to include the plural forms as well, unless the context clearly indicates otherwise. It should be recognized that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one element could be termed a "first element" and similarly, another element could be termed a "second element," or vice versa. The section headings used herein are for organizational purposes only and are not to be construed as limiting the subject matter described.

Unless indicated otherwise, the terms "about," "thereabout," "substantially," etc. mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Spatially relative terms, such as "right," left," "below," "beneath," "lower," "above," and "upper," and the like, may be used herein for ease of description to describe one element's or feature's relationship to another element or feature, as illustrated in the drawings. It should be recognized that the spatially relative terms are intended to encompass different orientations in addition to the orientation depicted in the figures. For example, if an object in the figures is turned over, elements described as "below" or "beneath" other elements or features would then be oriented "above" the other elements or features. Thus, the term "below" can, for example, encompass both an orientation of above and below. An object may be otherwise oriented (e.g., rotated 90 degrees or at other orientations) and the spatially relative descriptors used herein may be interpreted accordingly.

Unless clearly indicated otherwise, all connections and all operative connections may be direct or indirect. Similarly, unless clearly indicated otherwise, all connections and all operative connections may be rigid or non-rigid.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

Many different forms and implementations are possible without deviating from the spirit and teachings of this disclosure and so this disclosure should not be construed as limited to the example implementations set forth herein. Rather, these example implementations are provided so that this disclosure will be thorough and complete, and will convey the scope of the disclosure to those skilled in the art.

Reference in this specification to "one implementation" or "an implementation" means that a particular feature, structure, or characteristic described in connection with the implementation is included in at least one implementation of the present disclosure. The appearance of the phrase "in one implementation" in various places in the specification are not necessarily all referring to the same implementation, nor are separate or alternative implementations mutually exclusive of other implementations.

Motorcycles enthusiasts enjoy travelling with their motorcycles. Unlike a car or SUV, a motorcycle does not have a roof rack. It would be highly useful to have a device that could give a motorcycle user the features of a cargo bin attached to a roof rack.

The towable trailer system 100 of the present disclosure has several convenience features that give a motorcycle user the features of a cargo bin attached to a roof rack (along with other useful features described herein and as shown). The system may be taken apart and stowed in a small space. The system may be towed by a towing vehicle 103 such as a motorcycle. A cargo bin may be attached to the frame of the trailer so that the motorcycle can tow the cargo bin. The system gives the motorcycle user added functionality when travelling.

FIG. 1 shows a perspective view of a towable trailer system 100 of the present disclosure. FIG. 1 shows a towing vehicle 103 towing the towable trailer system 100. Towing vehicle 103 has been illustrated in dotted lines in FIG. 1. Although towing vehicle 103 is illustrated as a motorcycle, in FIG. 1, towing vehicle 103 is not limited to a motorcycle. For example, towing vehicle 103 may be an all-terrain vehicle, a golf cart, a trike, or similar vehicle.

As above, a feature of towable trailer system 100 is to provide improved transport apparatus for the towing of cargo, such apparatus capable of being quickly and easily disassembled for compact storage or travel when not in use. To achieve this objective, towable trailer system 100 comprises a plurality of connectable components that, when joined, form an operable trailer 102 and that when disconnected can be compactly stowed or transported. The connectable components of trailer 102 are configured to allow a single person to disassemble and reassemble trailer 102, as needed.

Figure 2:
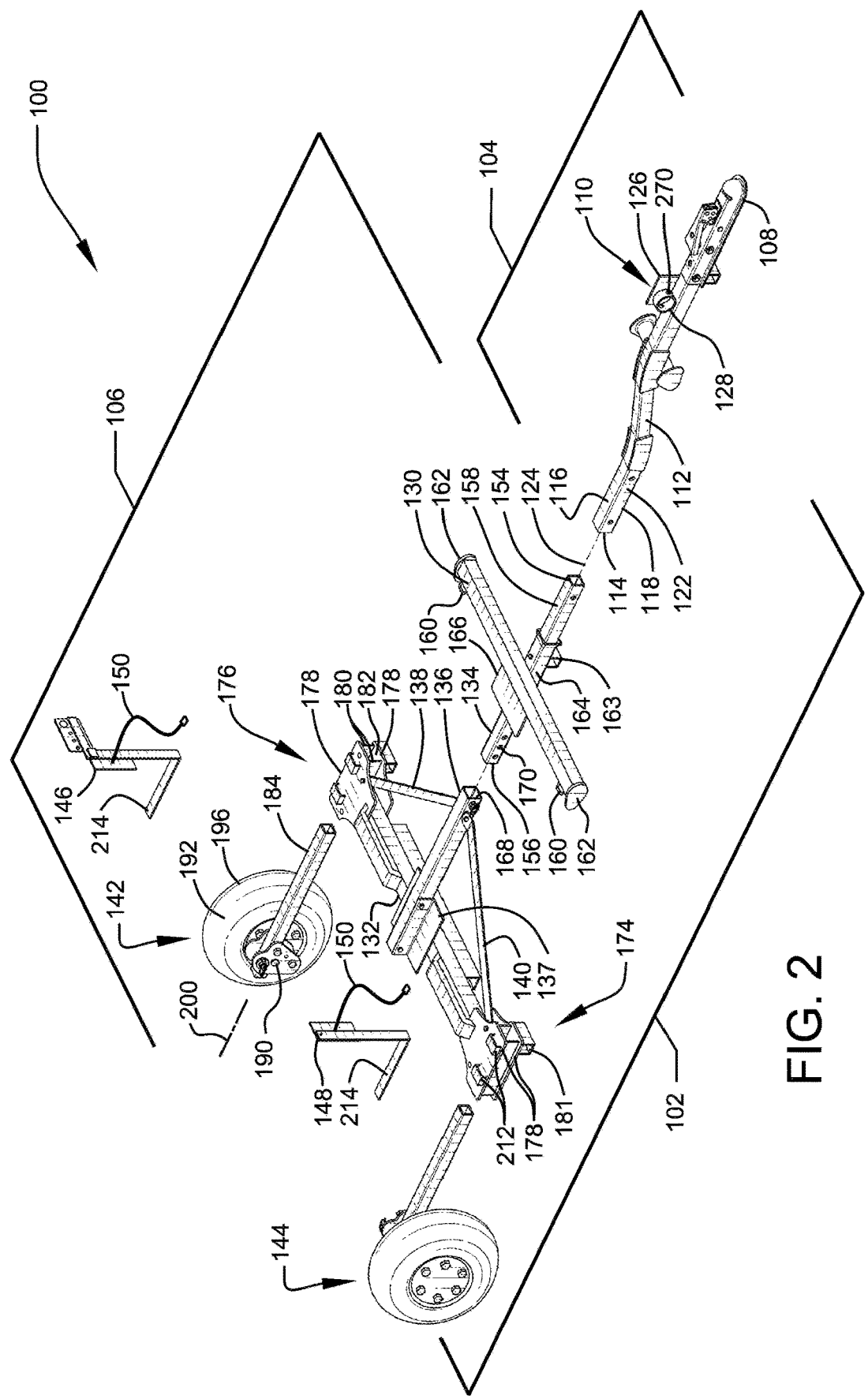
FIG. 2 shows an exploded perspective view of the towable trailer system of FIG. 1.

FIG. 2 shows an exploded view of towable trailer system 100 of FIG. 1. In defining the general organizational makeup of the apparatus, trailer 102 can be described as having two principal portions identified herein as hitch-connection assembly 104 and main body assembly 106. Hitch-connection assembly 104 and main body assembly 106 may be separated, as needed, for compact storage or transport, as shown. Demountable subcomponents forming hitch-connection assembly 104 and main body assembly 106 of trailer 102 are generally illustrated in FIG. 2.

In the present disclosure, hitch-connection assembly 104 includes hitch coupler 108, forming a hitch attachment point between trailer 102 and towing vehicle 103, and bin attachment point 110 enabling the mounting of a collapsible storage bin, as described below. Main body assembly 106 is formed from multiple demountable subcomponents, as shown. These include frame members, wheel assemblies, accessory electrical components, and an arrangement of cross bars adapted to support the cargo bin, which will be described further herein.

Beginning with the forward components, hitch-connection assembly 104 comprises first elongate member 112 having hitch coupler 108 at one end and connection member 114 at the opposing end. In the present disclosure, first elongate member 112 comprises a rigid tubular element that may be implemented as a rigid metallic tube. First elongate member 112 is implemented with an upper surface 116 and a bottom surface 118 connected by a left side surface 120 (see FIG. 7) and a right-side surface 122, the cross-section of which is generally square shaped. Other cross-section shapes may suffice. First elongate member 112 comprises a set of bends, as shown, allowing the hitch coupler 108 to be elevated relative to the opposing connection member 114 when hitch coupler 108 is properly installed on towing vehicle 103. When chassis is assembled, first elongate member 112 is generally aligned with longitudinal axis 124 of chassis, as shown.

Hitch coupler 108 can be implemented in many ways. In FIG. 1, hitch coupler 108 is configured to engage with a conventional trailer hitch ball of the towing vehicle 103. A variety of ball-type couplers are well known in the art to connect a towing vehicle 103 to a trailer 102. Commercially available units often include a ball-receiving housing arranged to receive trailer hitch ball and to retain the ball within the housing using a manually operated latching element. A hitch coupler 108 of this type, suitable for use in the present system, comprises a Fulton® brand straight tongue coupler produced by Horizon Global Corporation of Plymouth, Michigan. Other coupler assemblies may suffice. Apertures are provided within elongate member to enable securing of hitch coupler 108 using bolts, hitch-coupler pins, or similar mechanical fasteners. Alternately, hitch coupler 108 can be permanently affixed to elongate member by welding. Hitch coupler 108 is depicted in dashed lines in FIG. 3 through FIG. 9. In some implementations, other hitch assemblies, non-standard hitch assemblies or other coupling arrangement matching the connection point of the towing vehicle may suffice.

Bin attachment point 110 is shown positioned on first elongate member 112. Bin attachment point 110 is positioned on first elongate member 112 between hitch coupler 108 and connection member 114, as shown. Bin attachment point 110 comprises a plate 126 connected to one of the side surfaces of first elongate member 112. Plate 126 of bin attachment point 110 extends upward above upper surface 116 of first elongate member 112 and includes a tubular mount 128 projecting outwardly of plate 126, as shown. Tubular mount 128 comprises a circular cross section and is oriented generally perpendicular to longitudinal axis 124 of chassis, as shown. Bin attachment point 110 facilitates attachment of a collapsible cargo bin, which will be described further herein.

As above, main body assembly 106 is formed from a set of demountable subcomponents, which may be compactly arranged for storage or travel. In the depicted implementation, subcomponents of main body assembly 106 include first cross bar 130, second cross bar 132, second elongate member 134, third elongate member 136, Left diagonal brace 138, right diagonal brace 140, left-side wheel assembly 142, right-side wheel assembly 144, left-side brake light assembly 146, right-side brake light assembly 148, and accessory electrical components 150.

Second elongate member 134 comprises a forward end having connector 154 and a trailing end comprising connector 156. Second elongate member 134 comprises a rigid tubular element such as a rigid metallic tube. In the present disclosure, second elongate member 134 comprises a generally square cross-sectional shape, as shown. Other cross-section shapes may suffice. According to one implementation of the present disclosure, the forward connector 154 of second elongate member 134 is adapted to slide within the rear-facing connection member 114 of hitch-connection assembly 104 with a snug telescoping fit (see FIG. 1). A set of alignable apertures are provided to secure the connection of second elongate member 134 with hitch-connection assembly 104 with a locking pin.

First cross bar 130 serves as a connection point and support member for a cargo container to be towed as will be described later herein. First cross bar 130 comprises a rigid tubular member positioned above upper surface 158 of second elongate member 134. Each end of first cross bar 130 comprises a fixed U-shaped tie-down loop 160 and is capped with a teardrop-shaped cap plate 162, as shown. When chassis is assembled, second elongate member 134 is aligned generally parallel to longitudinal axis 124 with first cross bar 130 oriented generally perpendicular to longitudinal axis 124, as shown.

In one implementation of the present disclosure, first cross bar 130 is removably coupled to second elongate member 134 by central receiver 164. Central receiver 164 is rigidly fixed to the underside of first cross bar 130. As illustrated, a plate 166 is provided as additional reinforcement at the connection between central receiver 164 and first cross bar 130. Central receiver 164 is configured to slide over second elongate member 134, as shown in FIG. 1. A set of alignable apertures within central receiver 164 and second elongate member 134 are provided to enable securing of the members using a retaining pin, or similar fastener. In one implementation of the present disclosure, a tie-down point 163 in the form of a transverse tube segment is mounted to the underside of central receiver 164, as shown.

Connector 156 of second elongate member 134 is adapted to slide within the forward-facing connector 168 of third elongate member 136 with a snug telescoping fit (see FIG. 1). In one implementation of the present disclosure, connector 156 includes a series of closely-spaced apertures 170 formed in the sidewalls of second elongate member 134. A user can adjust the combined length of second elongate member 134 and third elongate member 136 by slidably adjusting the position of connector 156 within connector 168 and locking the assembly at a selected position by passing a retaining pin or similar fastener through the selected apertures 170. When assembled, third elongate member 136 is generally aligned with longitudinal axis 124, as shown.

Second cross bar 132 comprises a rigid tubular element, most preferably a rigid metallic tube. A set of angle brackets 137 are used to mechanically fasten second cross bar 132 to third elongate member 136 at roughly its midpoint. In one arrangement, angle brackets 137 are mechanically fastened using bolts, or similar fasteners. When assembled, second cross bar 132 is oriented generally perpendicular to longitudinal axis 124, as shown in FIG. 2. In one implementation of the present disclosure, a reinforcing transverse tube segment 133 is mounted to the underside of second cross bar 132, as shown. Tube segment 133 comprises open ends allowing the tube to be used as an additional tie-down point.

The distal ends of second cross bar 132 each include wheel connection points to which a respective wheel assembly may be mounted. More specifically, second cross bar 132 comprises both a right wheel connection point 174 and left wheel connection point 176, as shown.

The connection between third elongate member 136 and second cross bar 132 is further reinforced by two diagonal braces, as shown. Right diagonal brace 140 comprises a rigid bar that extends from third elongate member 136 near connector 168 to right wheel connection point 174. Left diagonal brace 138 comprises a rigid bar that extends from the opposing side of third elongate member 136 to left wheel connection point 176, as shown. Since right wheel connection point 174 is identically opposite to left wheel connection point 176, the following description will only make reference to left wheel connection point 176 and its associated structures with the understanding that the same disclosure is applicable to the opposing right wheel connection point 174 and its associated structures.

Figure 3:
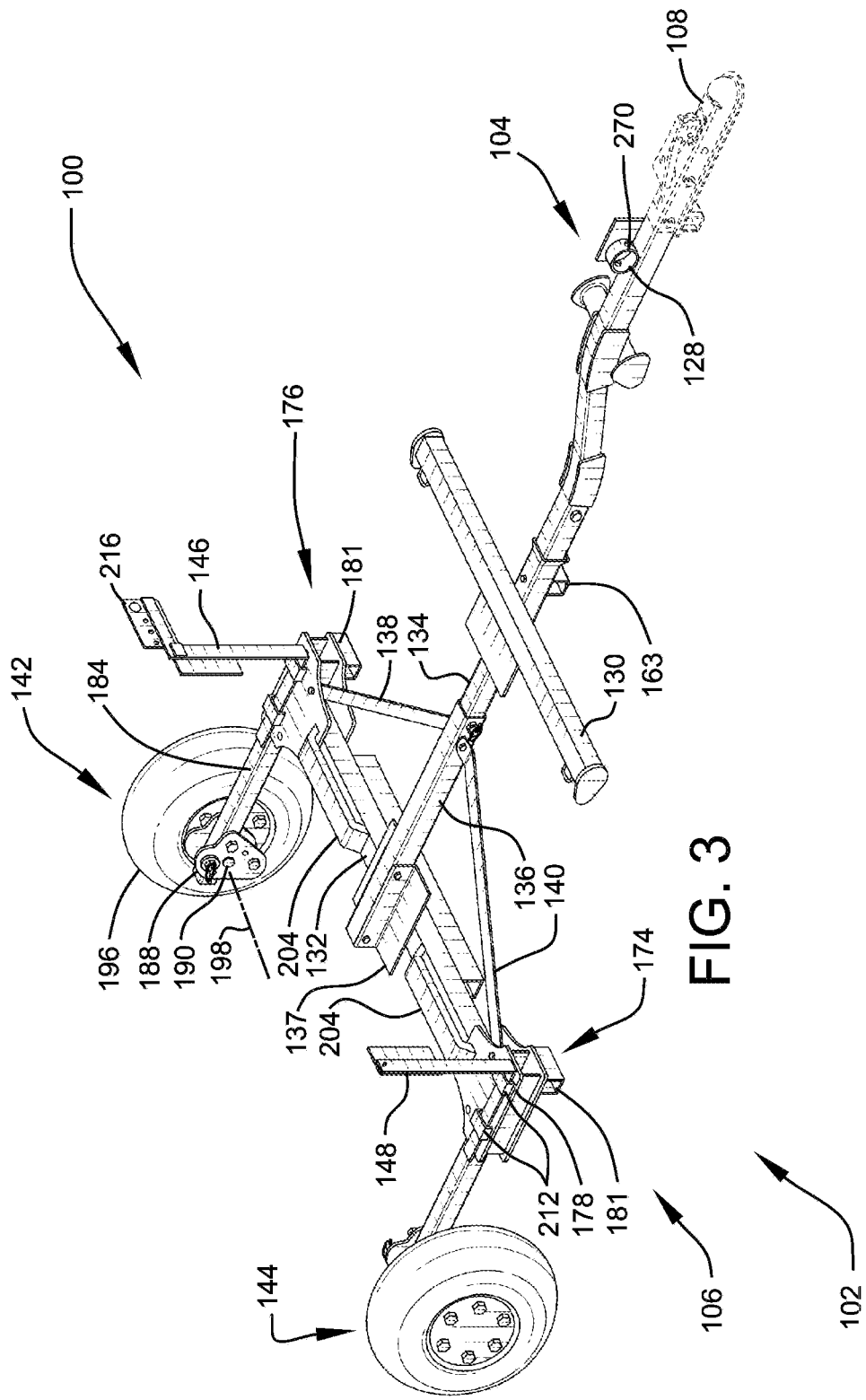
FIG. 3 shows a perspective view of the towable trailer system of FIG. 1.

Left wheel connection point 176 comprises upper and lower reinforcement plates 178, as shown. A set of spaced-apart vertical plates 180 extend between upper and lower reinforcement plates 178, thus forming a receiving socket 182 having a generally rectangular cross section, as shown. Socket 182 comprises an orientation generally parallel to longitudinal axis 124. Socket 182 is configured to receive coupling shaft 184 of left-side wheel assembly 142, as shown in FIG. 1 and FIG. 3. As noted above, the arrangements of left wheel connection point 176 and left-side wheel assembly 142 are an identical mirror of the opposing right wheel connection point 174 and right-side wheel assembly 144, the arrangements and operations of both assemblies fully enabled by the descriptions of the left-side assemblies provided herein. In one implementation of the present disclosure, a tie-down point 181 in the form of a transverse tube segment is mounted to the underside of lower reinforcement plates 178, as shown. It should be noted that tie-down point 181 is shown as a hollow tube. In such an implementation, a lock may be inserted into tie-down point 181 so that the lock is surrounded. A thief would be unable to cut the lock since it is surrounded by the outer portions of tie-down point 181.

As above, left-side wheel assembly 142 comprises one of two demountable wheel assemblies of trailer 102. Left-side wheel assembly 142 includes coupling shaft 184, raising and lowering mechanism 188, and stub-axle assembly 190 to which wheel 192 is rotationally attached.

Referring to FIG. 2, coupling shaft 184 comprises an elongated tubular element, most preferably a hollow steel tube having a square outer dimension permitting the tubular coupling shaft 184 to be inserted into the rear-facing open end of socket 182 (see FIG. 1 and FIG. 3). One or more removable fasteners may be used to secure coupling shaft 184 within socket 182, thus operably joining left-side wheel assembly 142 with left wheel connection point 176.

As above, wheel 192 comprises a central wheel rim on which tire 196 may be mounted, as shown. In one preferred implementation of the present system, tire 196 comprises a rubber-pneumatic trailer tire. Wheel 192 is mounted on stub-axle assembly 190, as shown. Stub-axle assembly 190 defines an axis of rotation 198, about which wheel 192 freely rotates. Such axis of rotation 198 is aligned generally perpendicularly to both longitudinal axis 200 of coupling shaft 184 and longitudinal axis 124. It is noted that the preferred arrangements of stub-axle assembly 190 eliminates the need for a continuous axle member joining the left-side and right-side wheel assemblies, thus providing additional working clearance and ease in disassembling the apparatus.

Raising and lowering mechanism 188, when provided, is configured to join stub-axle assembly 190 and coupling shaft 184 in an adjustable relationship.

Raising and lowering mechanism 188 may include a locking mechanism configured to lock stub-axle assembly 190 and wheel 192 in a selected relationship relative to coupling shaft 184, thus to the other portions of main body assembly 106.

Figure 4:
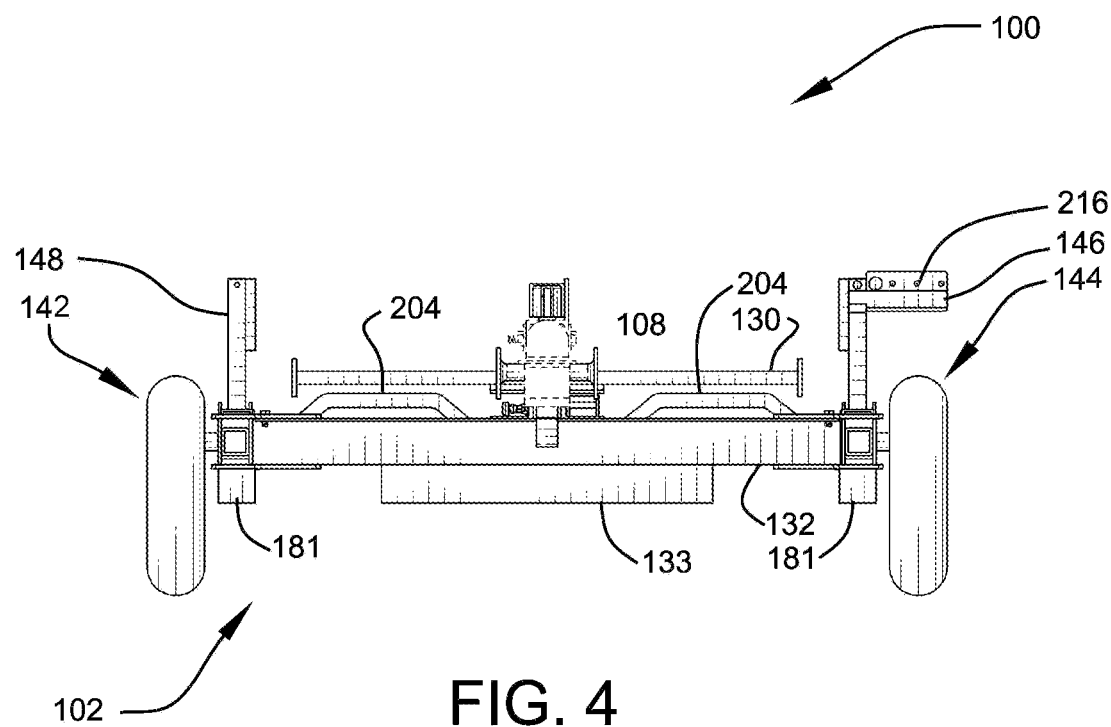
FIG. 4 shows a rear view the towable trailer system of FIG. 1.
Figure 5:
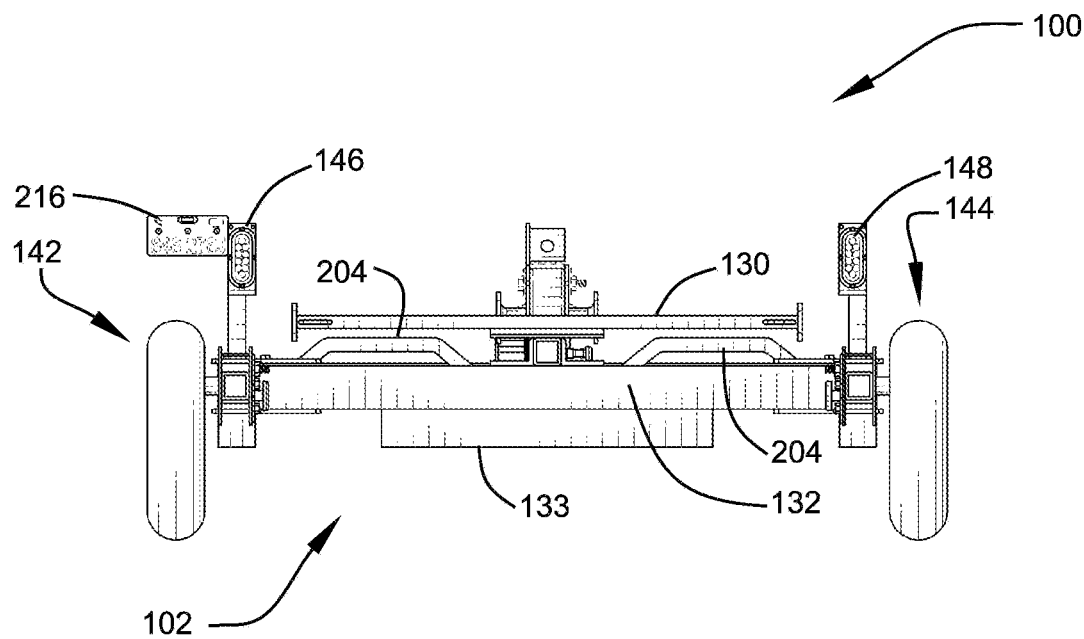
FIG. 5 shows a front view the towable trailer system of FIG. 1.
Figure 6:
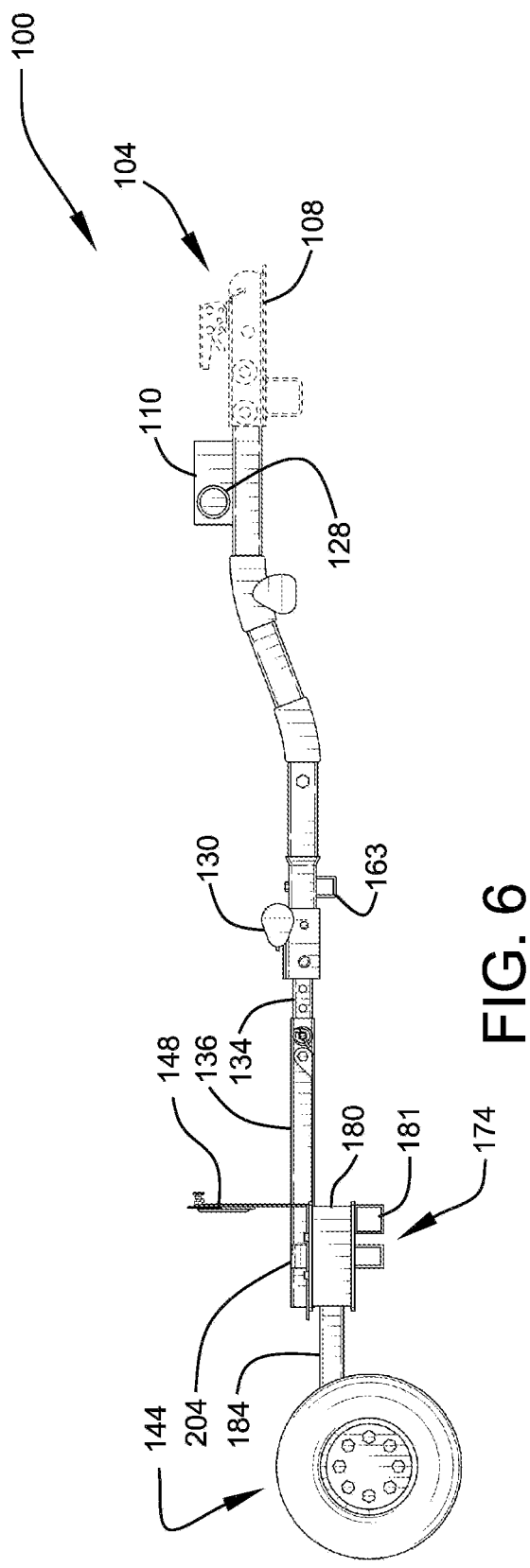
FIG. 6 shows a left-side view the towable trailer system of FIG. 1.
Figure 7:
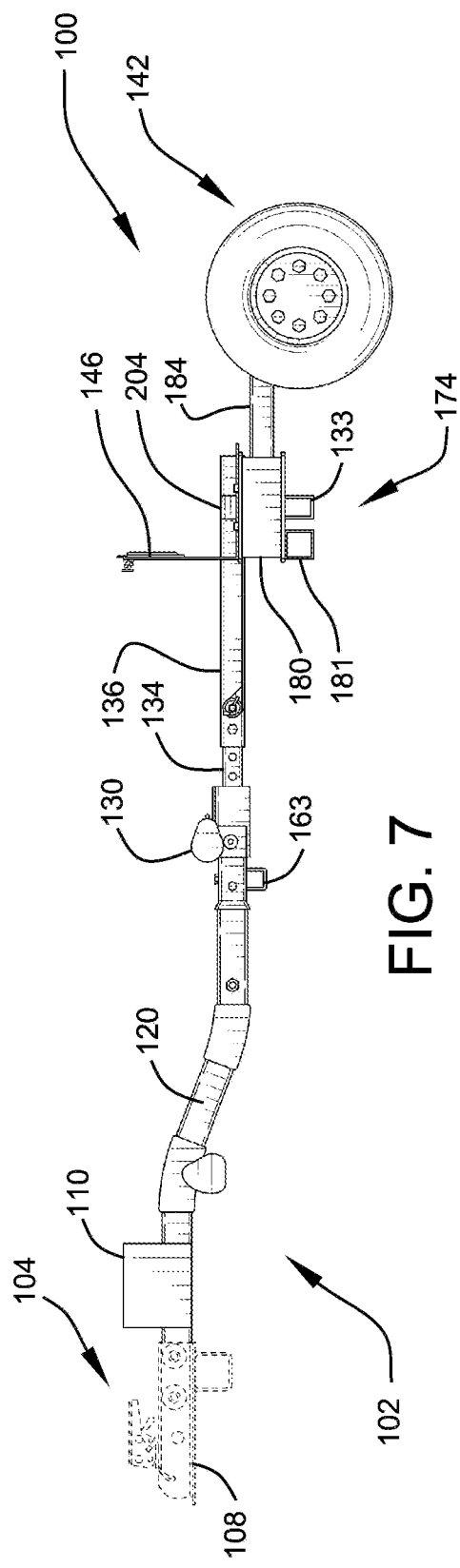
FIG. 7 shows a right-side view the towable trailer system of FIG. 1.
Figure 8:
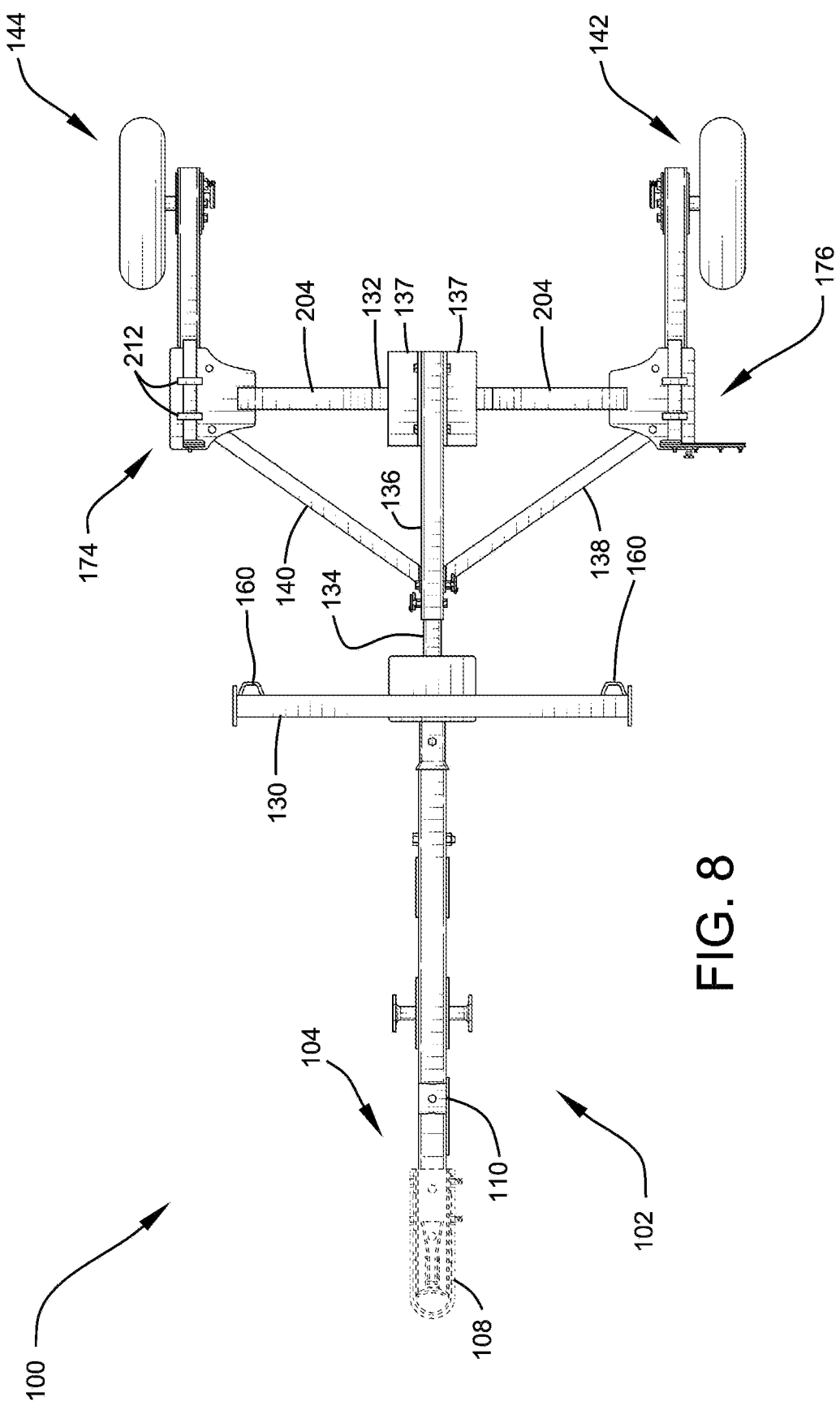
FIG. 8 shows a top view the towable trailer system of FIG. 1.
Figure 9:
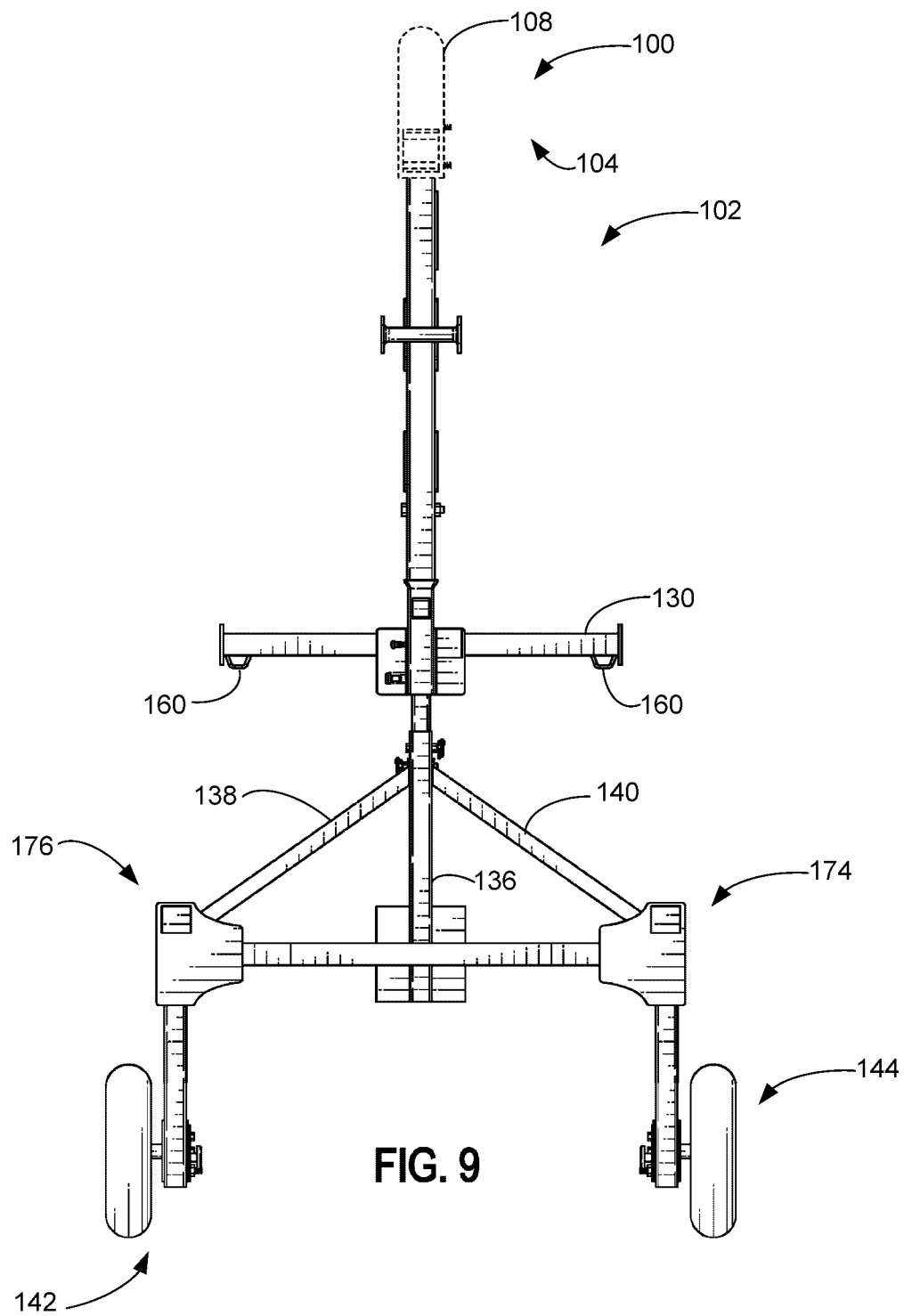
FIG. 9 shows a bottom view the towable trailer system of FIG. 1.

FIG. 3 through FIG. 9 provide various views of towable trailer system 100 in an assembled configuration. More specifically, FIG. 3 shows a perspective view of the assembled towable trailer system 100. FIG. 4 and FIG. 5 show rear and front views, respectively, FIG. 6 and FIG. 7 show left-side and right-side views, respectively. FIG. 8 and FIG. 9 show top and bottom views, thereof.

Figure 10:
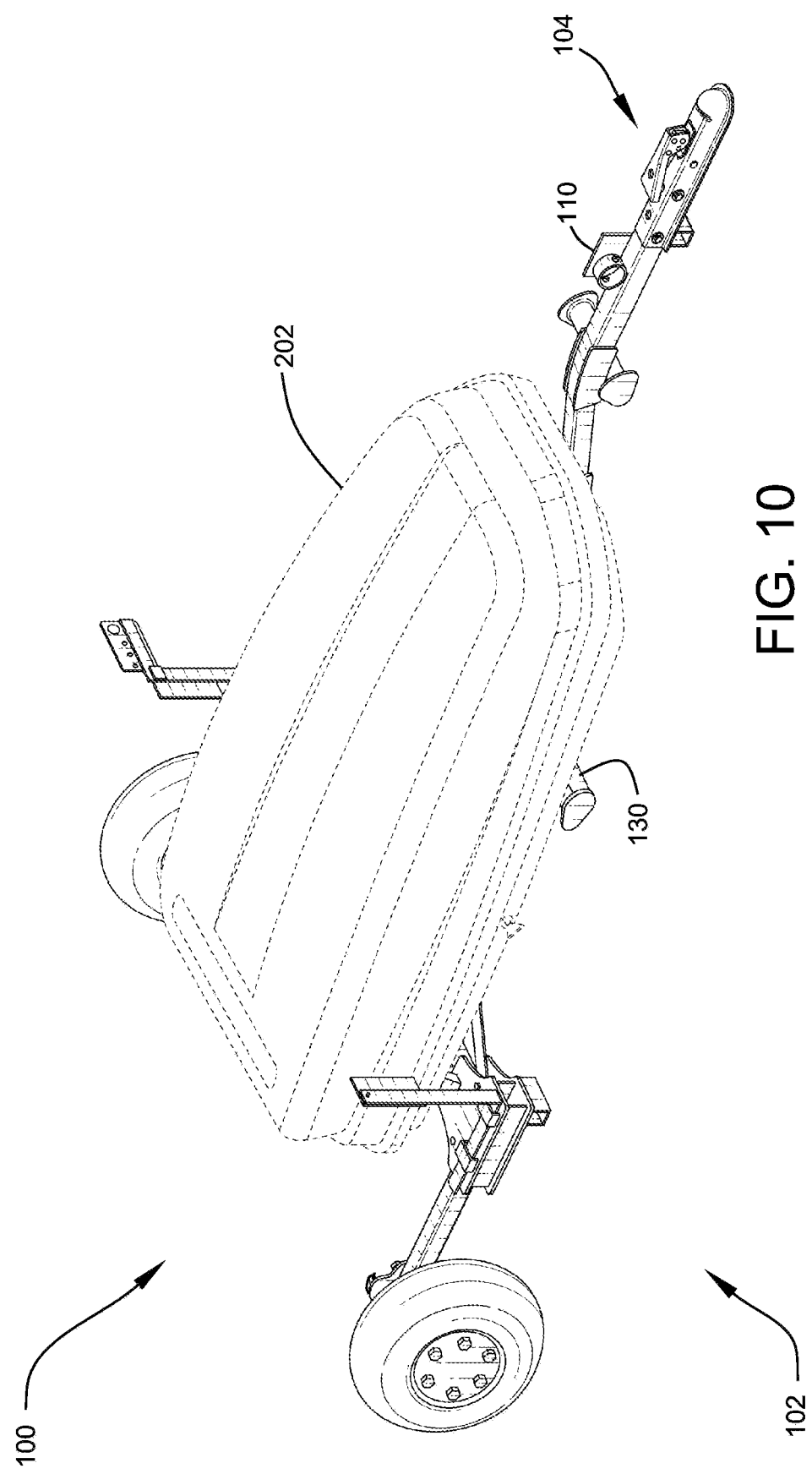
FIG. 10 shows a perspective view of the towable trailer system of FIG. 1, fitted with a cargo holding box, according to another preferred embodiment of the present disclosure.

FIG. 10 shows a perspective view of towable trailer system 100 of FIG. 1, fitted with a cargo holding box 202, according to another preferred implementation of the present disclosure. Referring to FIG. 10 and the prior illustrations of the present disclosure, a set of U-shaped support members 204 are joined to the upper face of second cross bar 132. The support members 204 form supportive anchor points for cargo holding box 202. The hard-shell bottom portion of cargo holding box 202 may be removably anchored to first cross bar 130 and support members 204 by a set of releasable mounts, such as, for example, those provided by model 05738 Quick Grip Mount Assembly produced by Thule Inc. of Seymour, CT. Such quickly-attachable mounts include a set of clamping jaws adapted to engage first cross bar 130 and upper support members 204. Those with ordinary skill in the art will now appreciate that upon reading this specification and by their understanding the art of roof-mounted cargo boxes as described herein, methods of coupling such devises to the disclosed apparatus will be understood by those knowledgeable in such art.

FIG. 1 through FIG. 10 illustrate left-side brake light assembly 146, right-side brake light assembly 148 of the present system. As both assemblies are of similar construction, only one side will be described with the understanding that the descriptions are applicable to both the right and left side assemblies. In reference to right-side brake light assembly 148, the upper surface of the upper reinforcement plate 178 comprises a set of U-shaped retainers 212 adapted to retain an L-shaped bracket 214 of the right taillight and turn signal assembly 148, as shown. A set of removable retaining pins may be used to secure the brake-light assemblies to its respective reinforcement plate 178. Electrical components 150 include wiring enabling the coupling of left-side brake light assembly 146 and right-side brake light assembly 148 to the electrical system of the towing vehicle. Left-side brake light assembly 146 and right-side brake light assembly 148 are arranged to function both as brake lights and as turn signals. Those with ordinary skill in the art will now appreciate that upon reading this specification and by their understanding the art of trailer electrical wiring as described herein, methods of implementing such wiring will be understood by those knowledgeable in such art. It is noted that one of the two brake light assemblies may include a license-plate mount 216 to permit the mounting of a license-plate required in many jurisdictions for operation on public roads.

Except as noted above, the components of towable trailer system 100 are constructed from one or more rigid and durable materials, preferably a metallic material. Upon reading this specification, it should be appreciated that, under appropriate circumstances, considering such issues as user preferences, design preference, structural requirements, marketing preferences, cost, available materials, technological advances, etc., other material arrangements such as, for example, lightweight fiber-reinforced composites, steel, rigid polymers, etc., may be sufficient.

Figure 11:
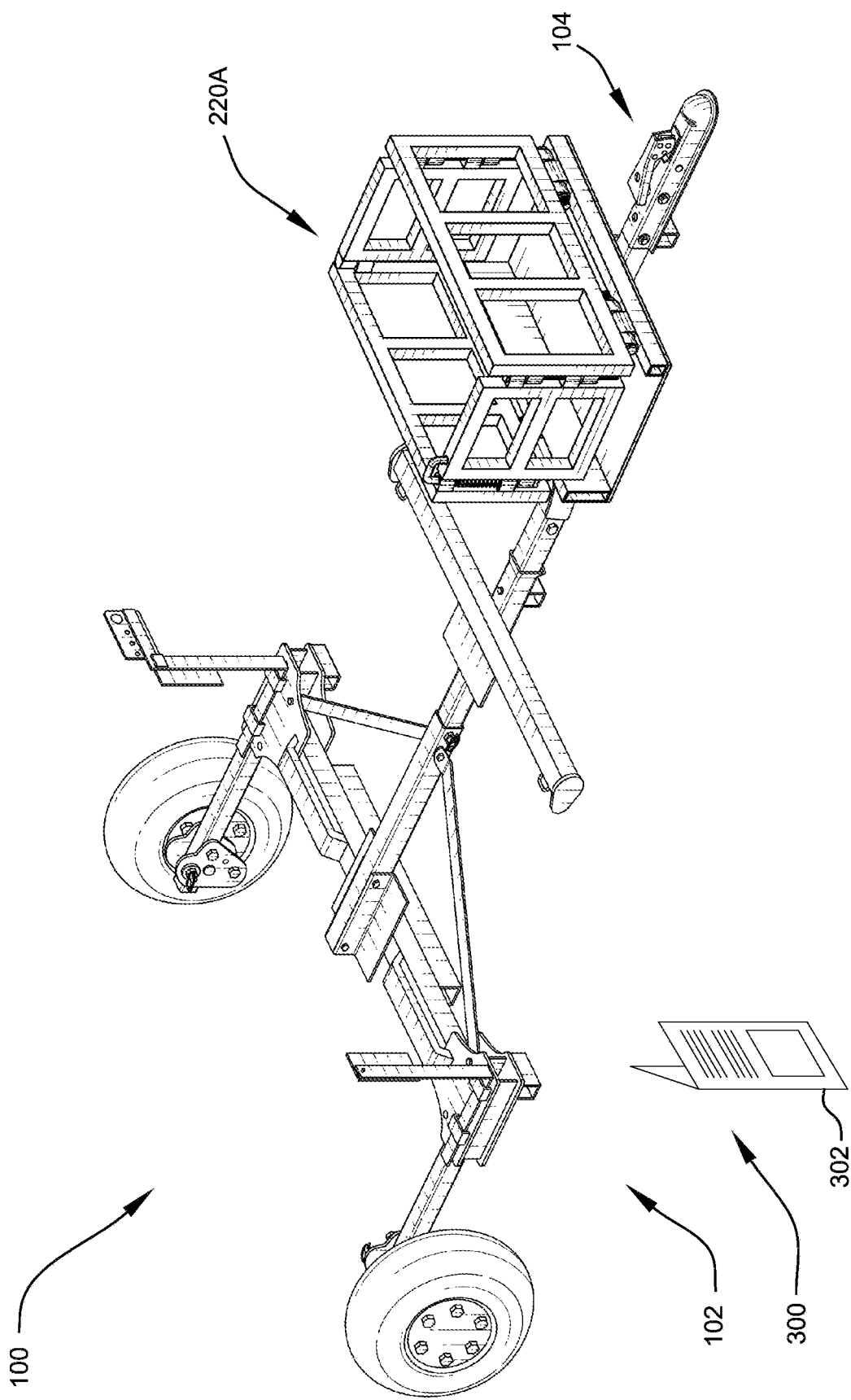
FIG. 11 shows a perspective view of the towable trailer system of FIG. 1, fitted with a first collapsible cargo bin, according to a preferred embodiment of the present disclosure.
Figure 12:
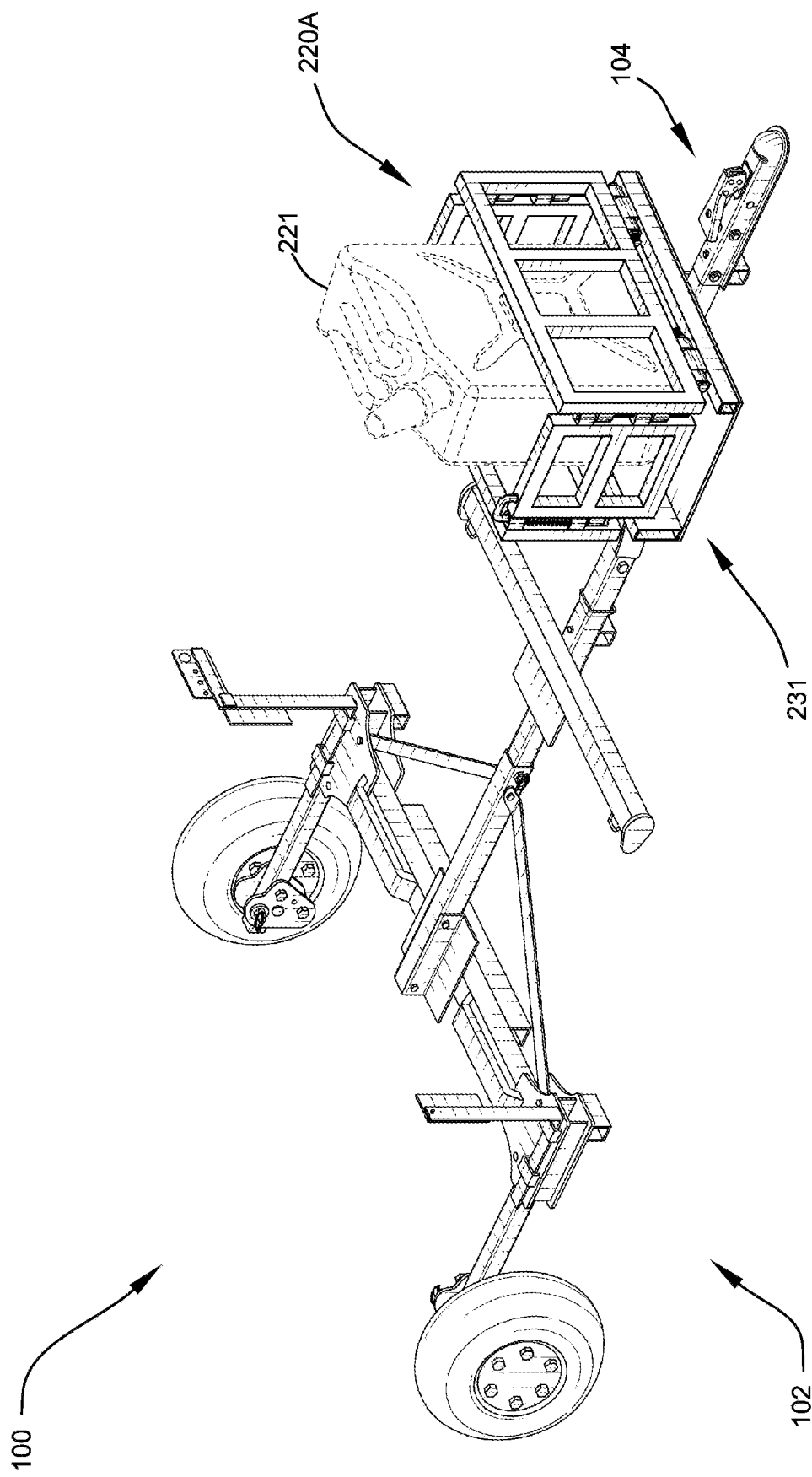
FIG. 12 shows a perspective view of the towable trailer system of FIG. 1, with the first collapsible cargo bin in an in-use condition, according to a preferred embodiment of the present disclosure.

FIG. 11 shows a perspective view of towable trailer system 100 of FIG. 1, fitted with a collapsible cargo bin adapted to be detachably secured to the trailer 102. Such a collapsible cargo bin is designed to accommodate gas tanks, but can carry any items that will fit within the container (e.g., coolers, beach items, etc.) The collapsible cargo bin is adaptable to multiple sizes, which allows a user to match the holding capacity of the bin to accommodate specific items to be transported. Two size arrangements are described in the present disclosure. The first size arrangement, identified herein as collapsible cargo bin 220A, is depicted in FIG. 11 and FIG. 12. As best illustrated in FIG. 12, the physical arrangements of collapsible cargo bin 220A allows the bin to hold one five-gallon gas tank 221, as shown.

Figure 13:
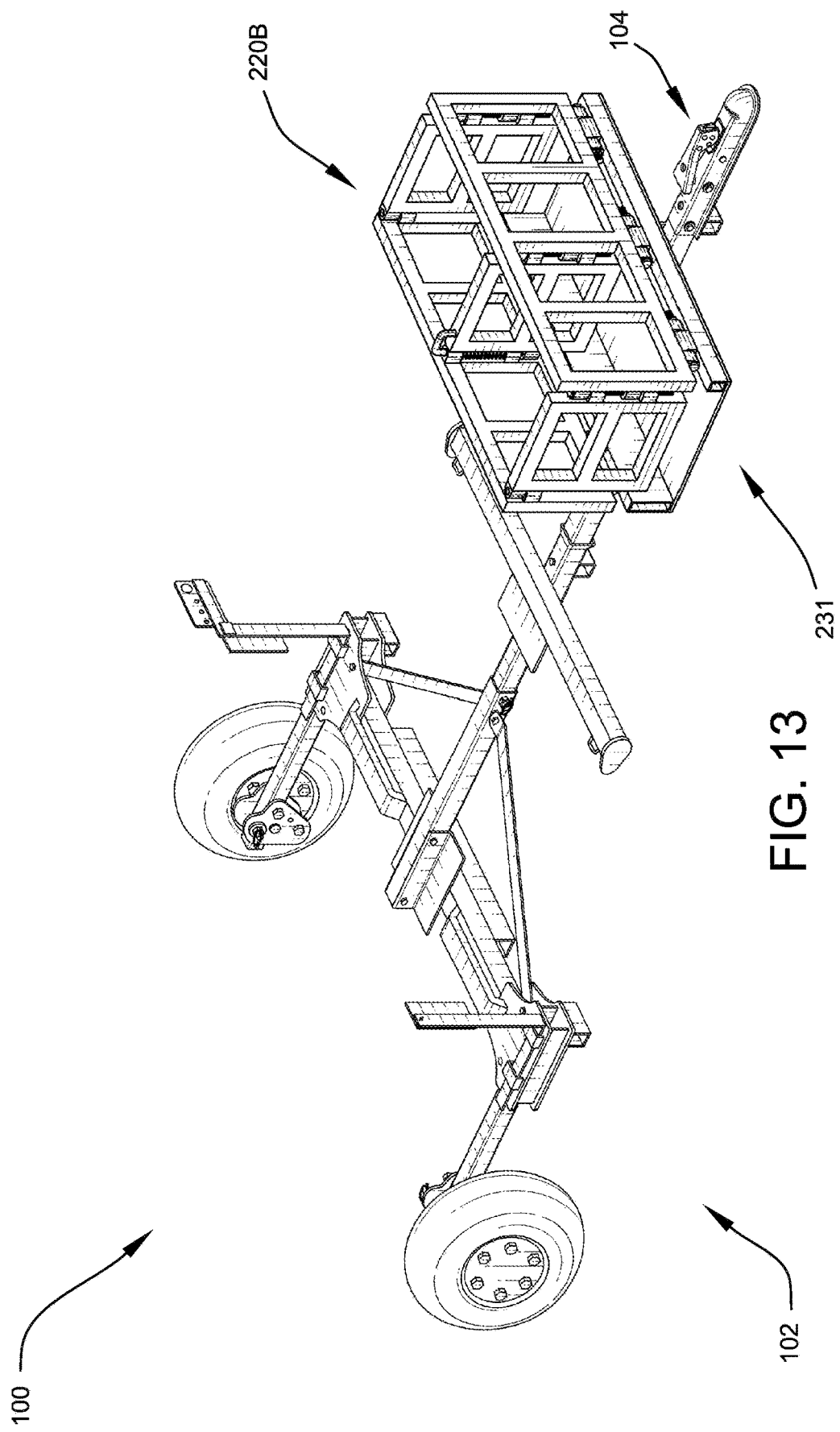
FIG. 13 shows a perspective view of the towable trailer system of FIG. 1, fitted with a second collapsible cargo bin, according to a preferred embodiment of the present disclosure.
Figure 14:
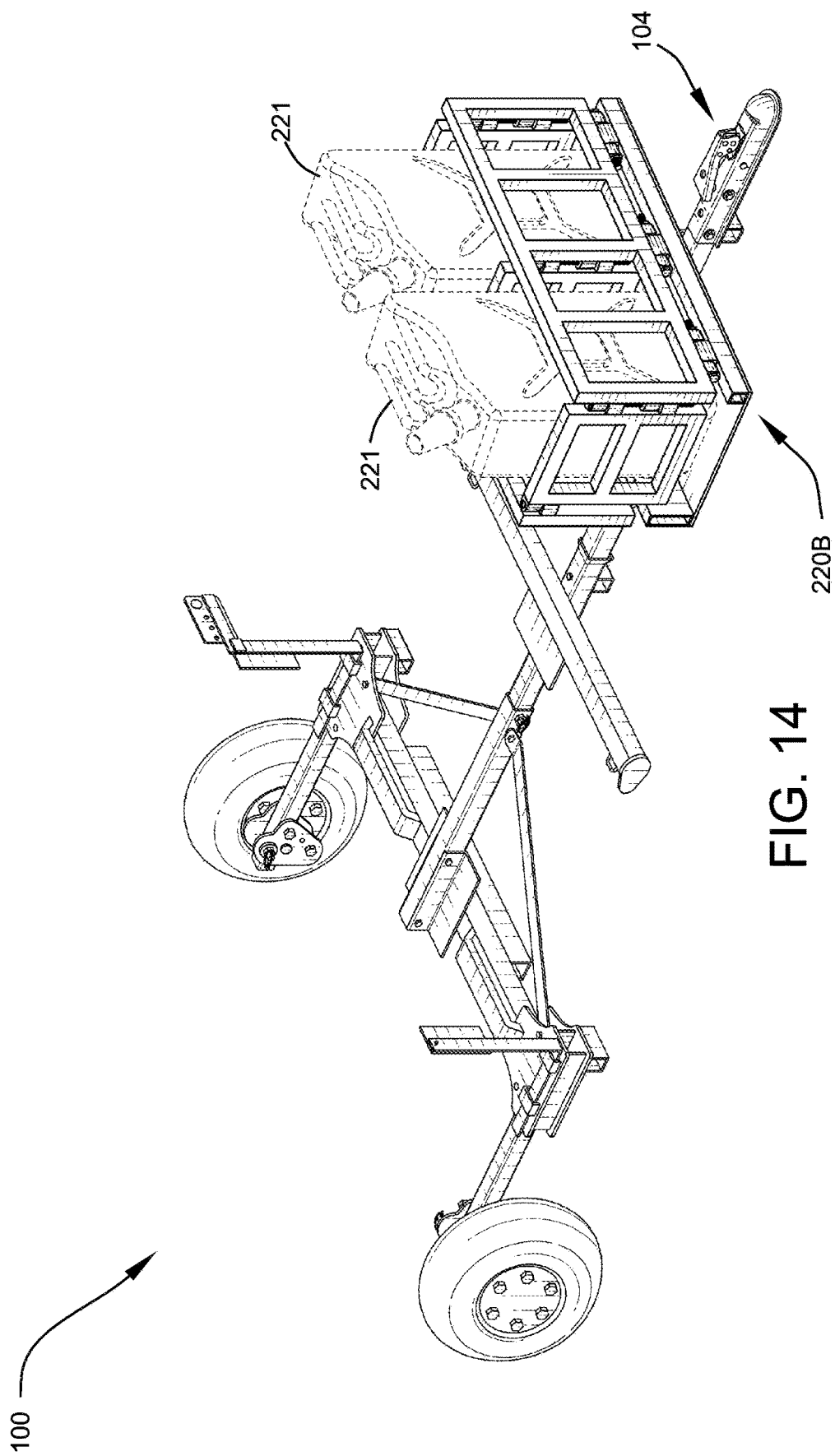
FIG. 14 shows a perspective view of the towable trailer system of FIG. 1, with the second collapsible cargo bin in an in-use condition, according to a preferred embodiment of the present disclosure.
Figure 15:
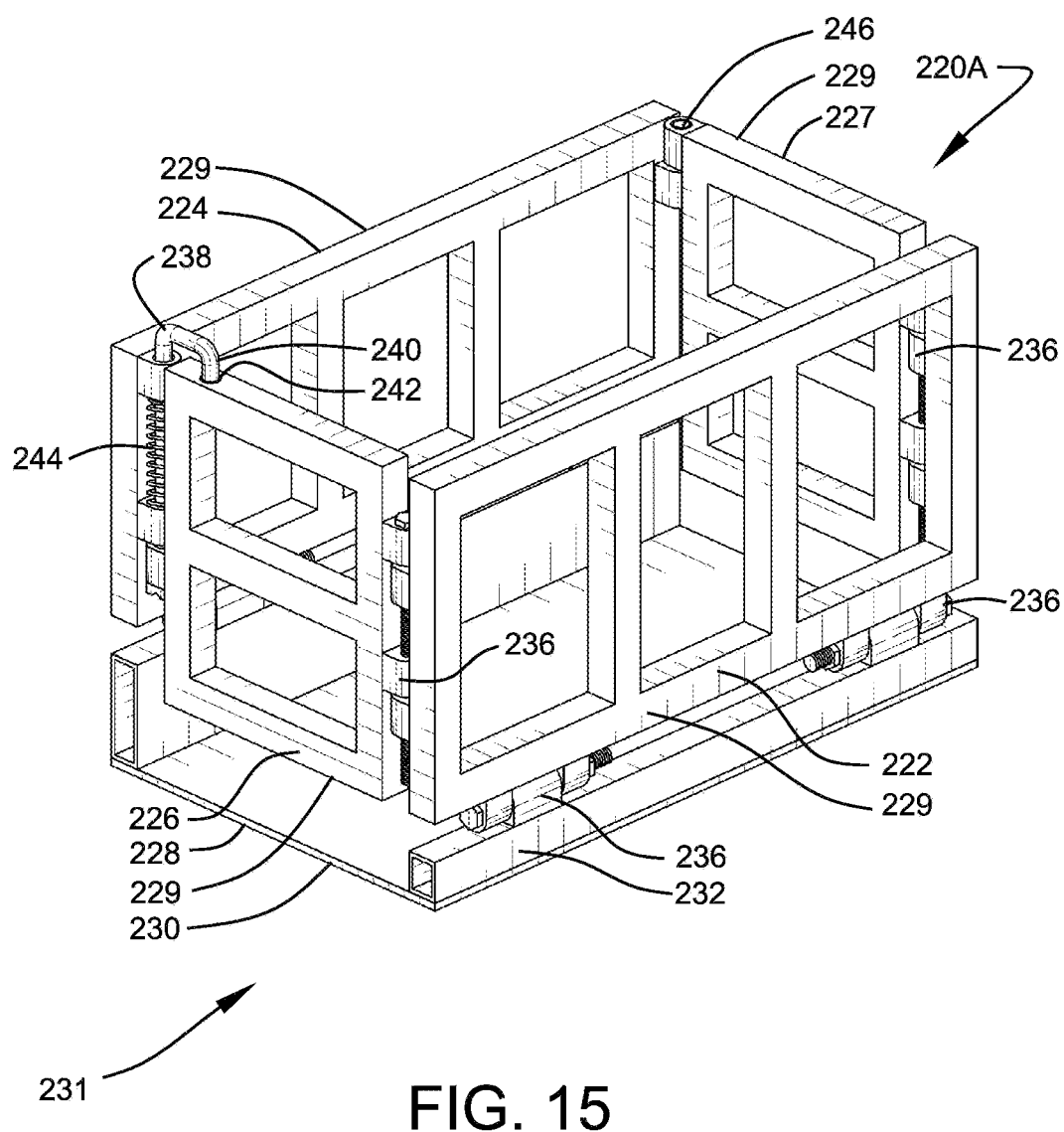
FIG. 15 shows an enlarged perspective view of the first collapsible cargo bin of FIG. 11.
Figure 16:
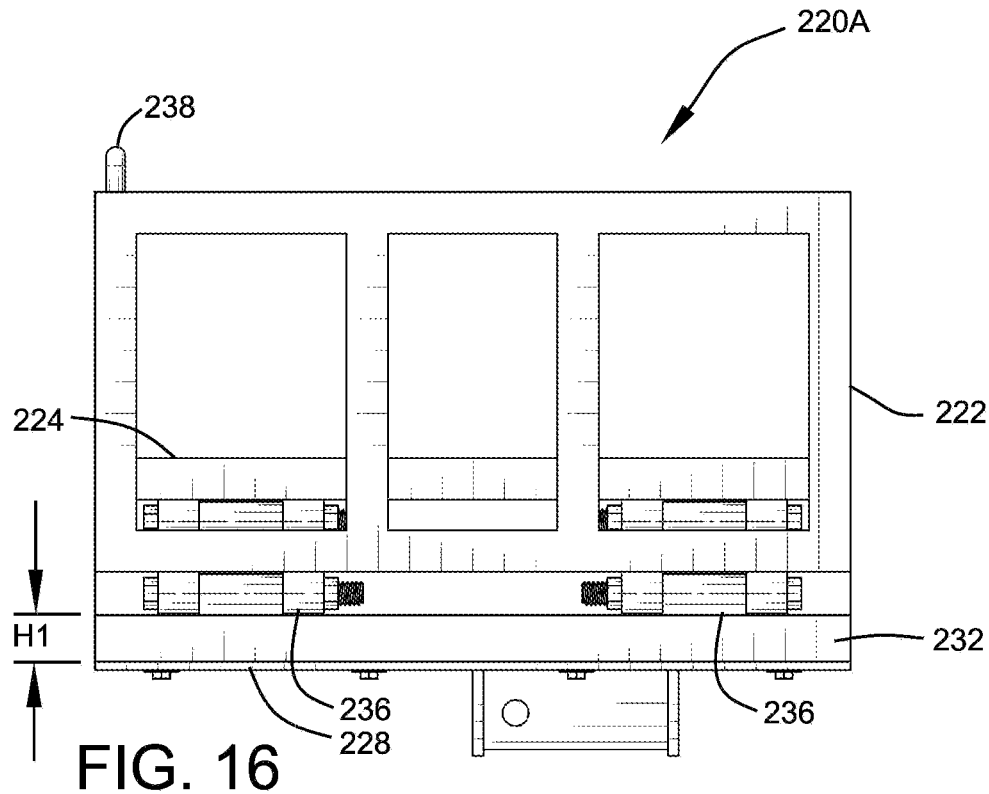
FIG. 16 shows a front view of the first collapsible cargo bin of FIG. 11.
Figure 17:
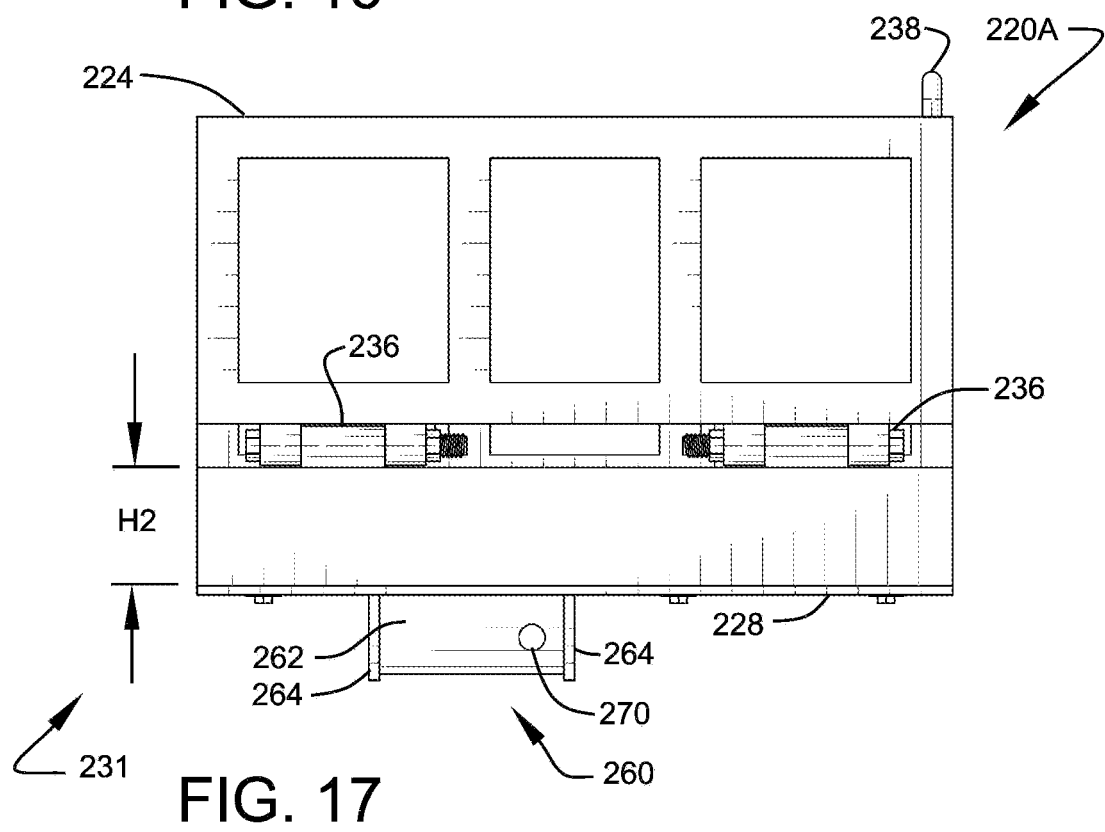
FIG. 17 shows a rear view of the first collapsible cargo bin of FIG. 11.
Figure 18:
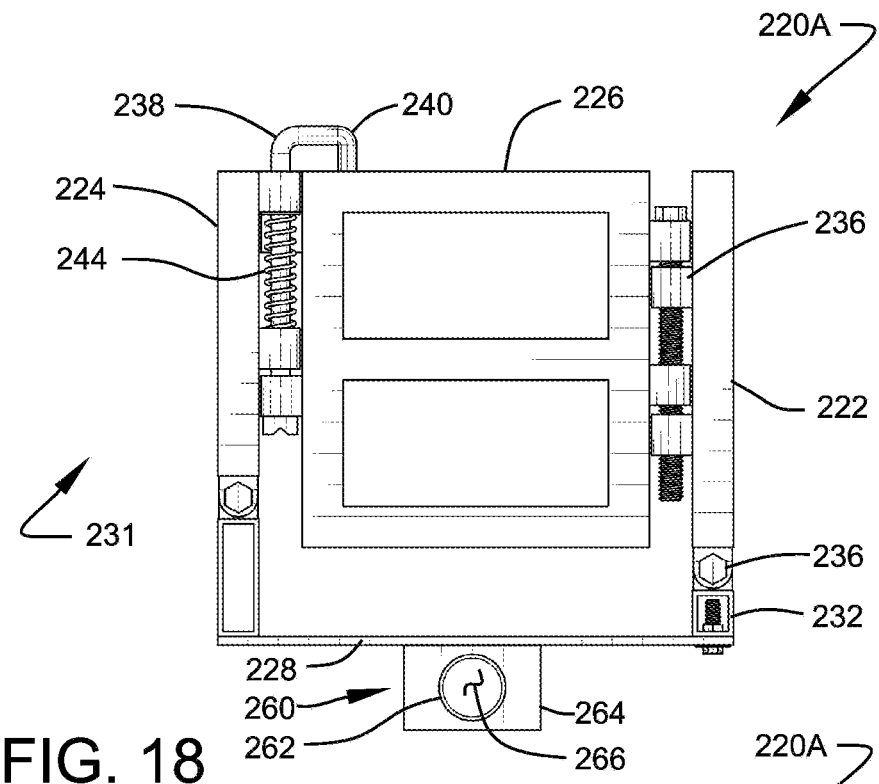
FIG. 18 shows a left-side view of the first collapsible cargo bin of FIG. 11.
Figure 19:
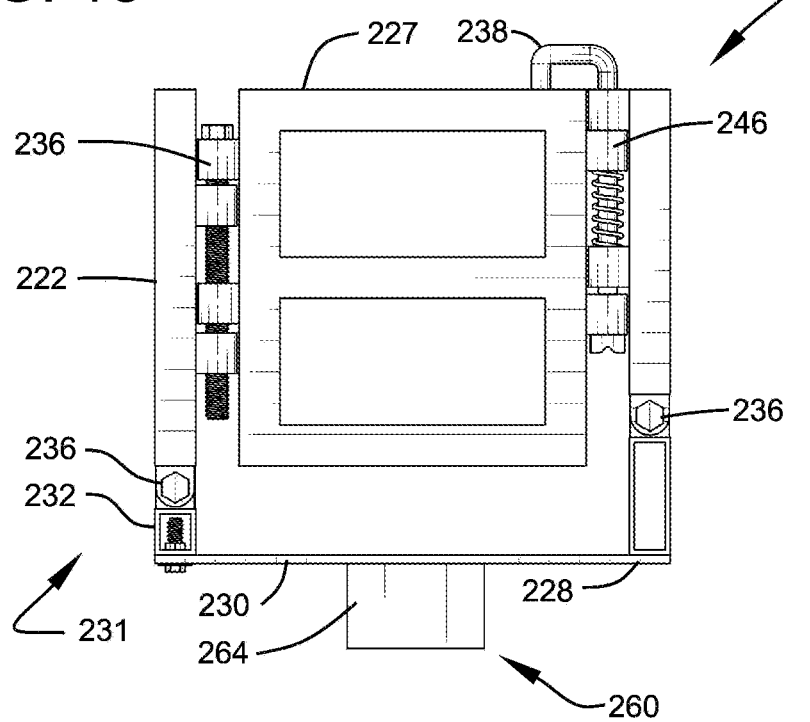
FIG. 19 shows a right-side view of the first collapsible cargo bin of FIG. 11.
Figure 20:
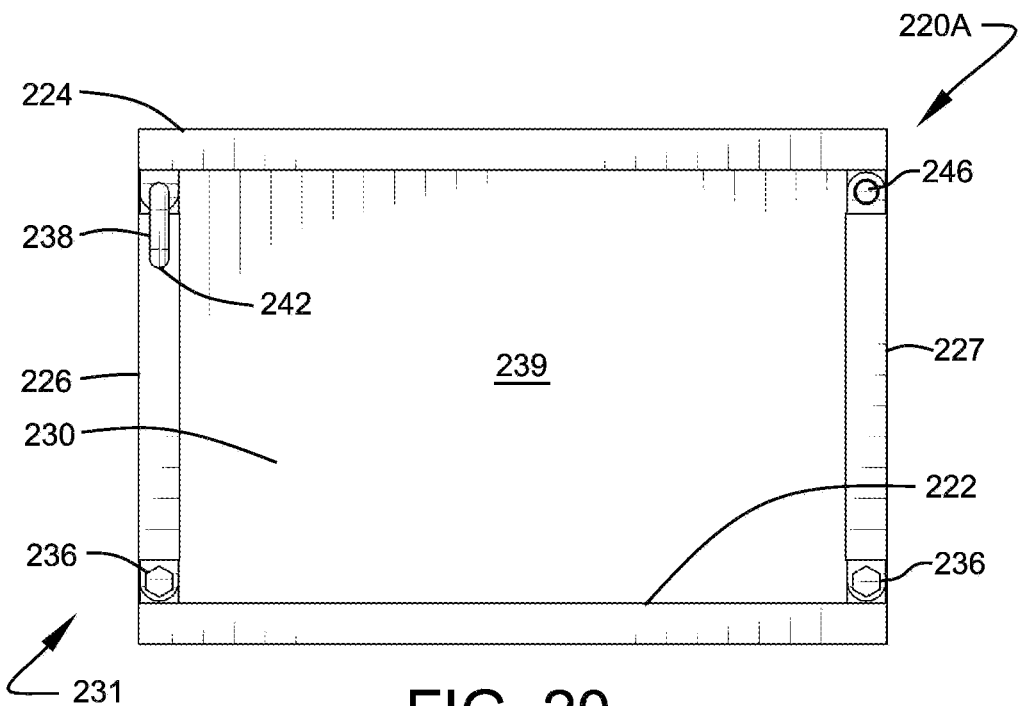
FIG. 20 shows a top view of the first collapsible cargo bin of FIG. 11.
Figure 21:
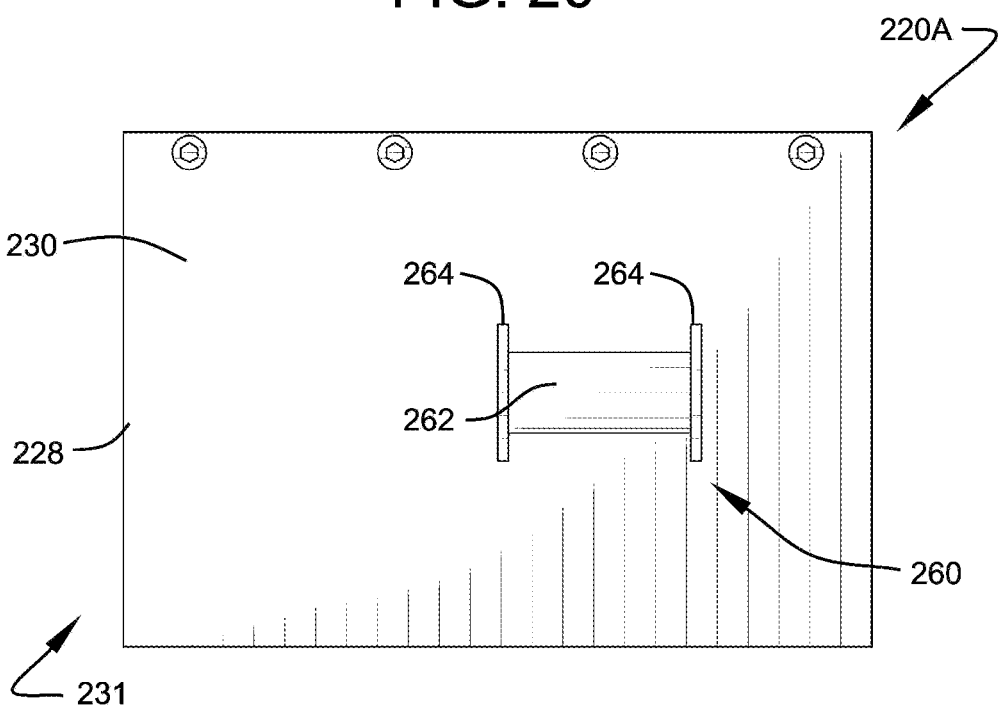
FIG. 21 shows a bottom view of the first collapsible cargo bin of FIG. 11.
Figure 22:
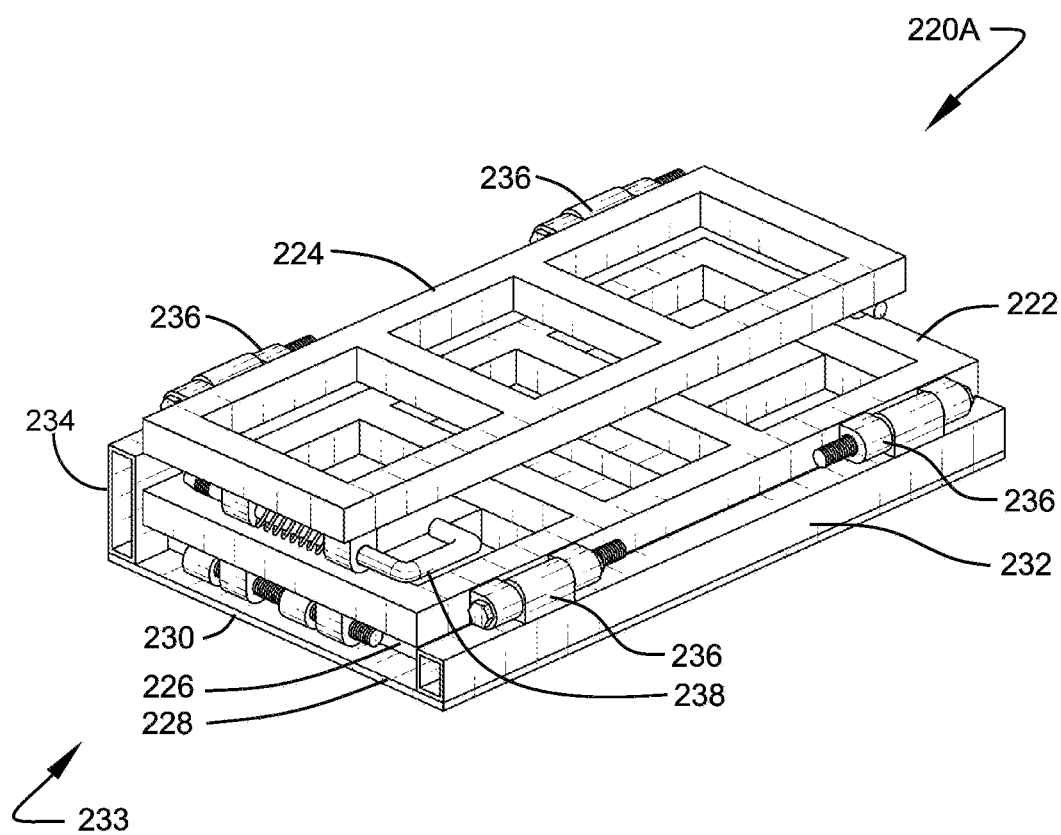
FIG. 22 shows a perspective view of the first collapsible cargo bin of FIG. 11 in a collapsed configuration.
Figure 23:
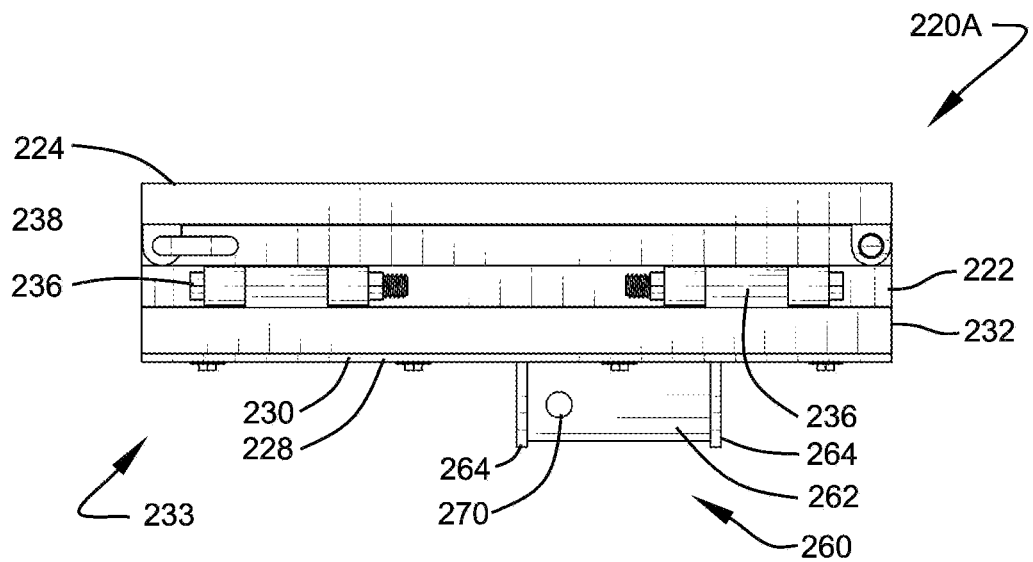
FIG. 23 shows a front view of the first collapsible cargo bin of FIG. 11 in the collapsed configuration.
Figure 24:
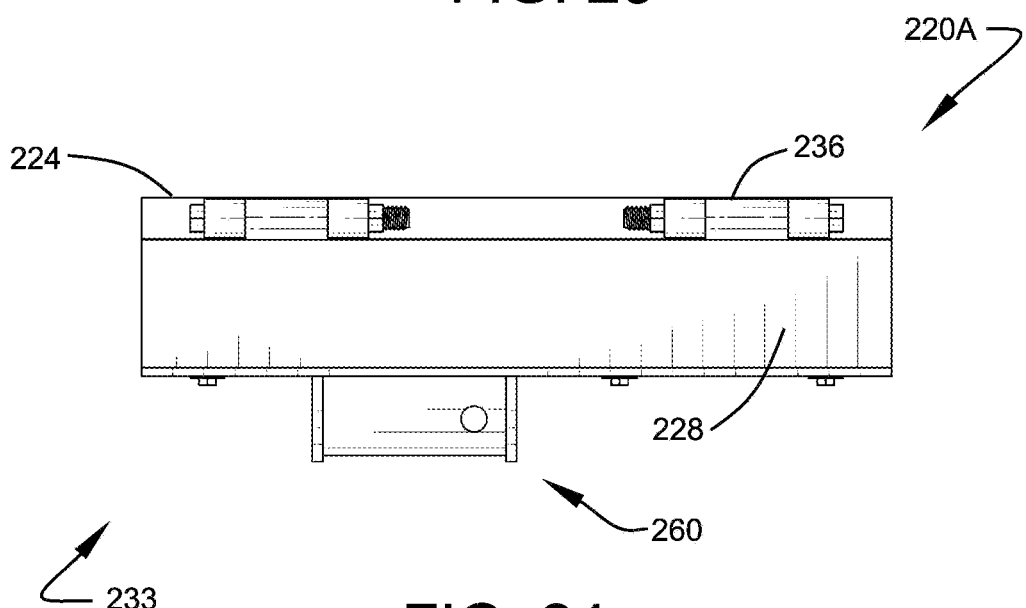
FIG. 24 shows a rear view of the first collapsible cargo bin of FIG. 11 in the collapsed configuration.
Figure 25:
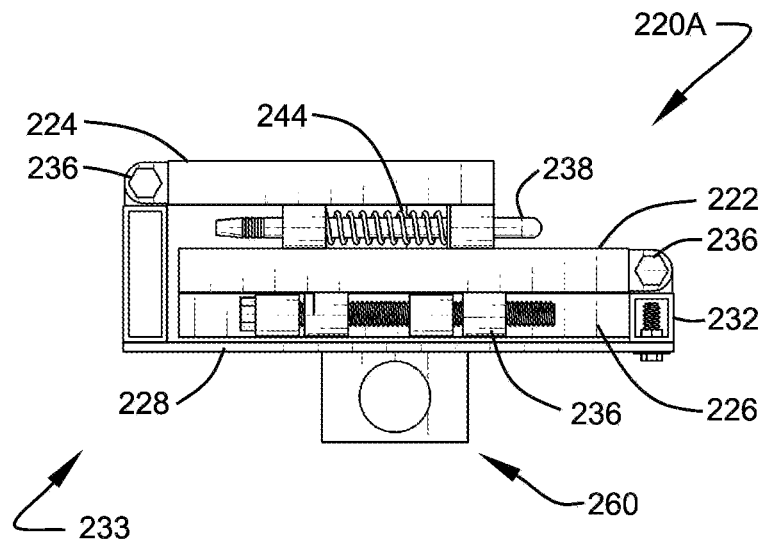
FIG. 25 shows a left-side view of the first collapsible cargo bin of FIG. 11 in the collapsed configuration.
Figure 26:
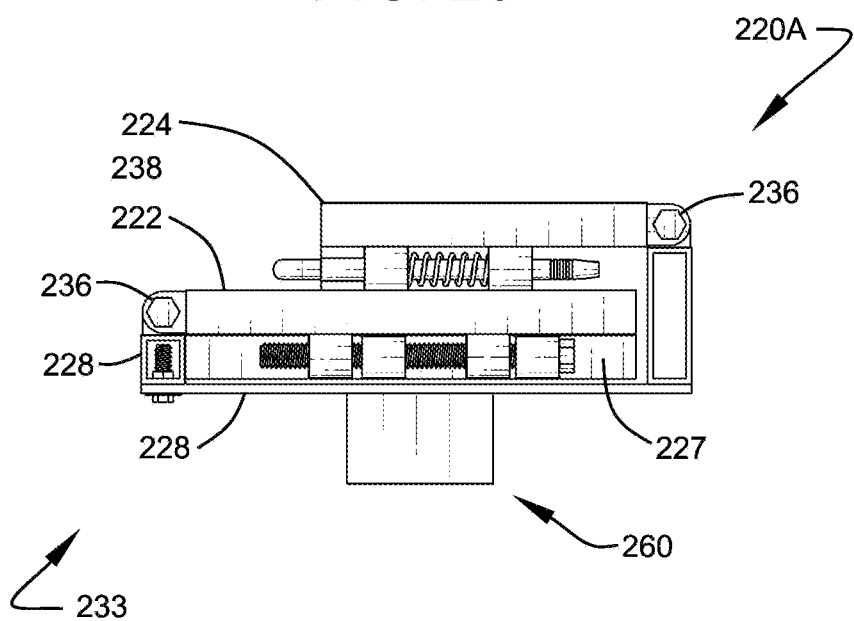
FIG. 26 shows a right-side view of the first collapsible cargo bin of FIG. 11 in the collapsed configuration.
Figure 27:
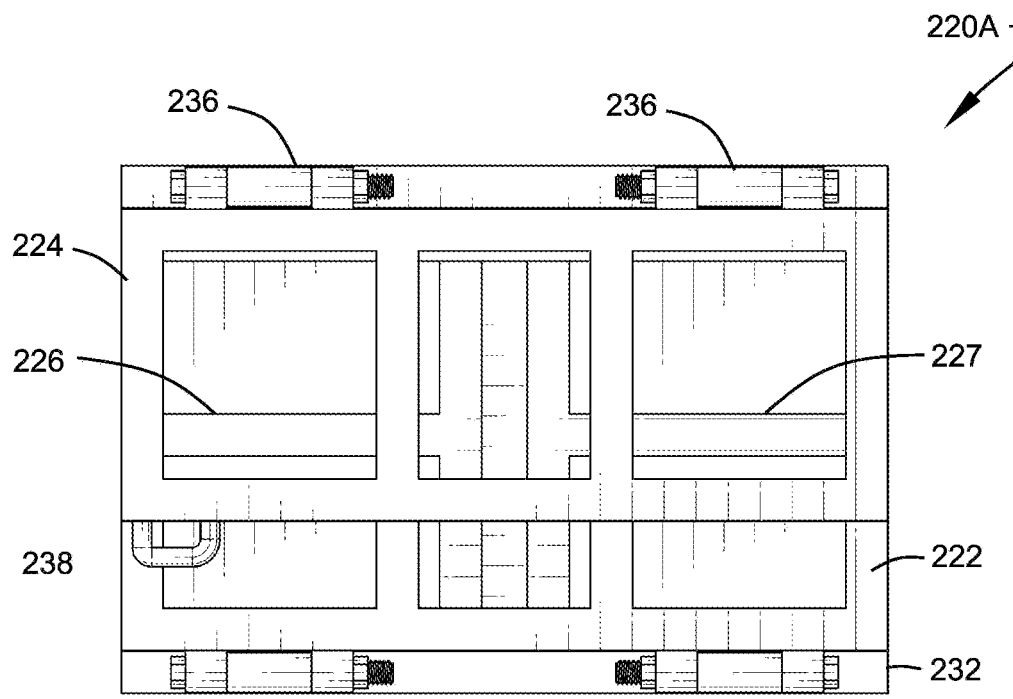
FIG. 27 shows a top view of the first collapsible cargo bin of FIG. 11 in the collapsed configuration.
Figure 28:
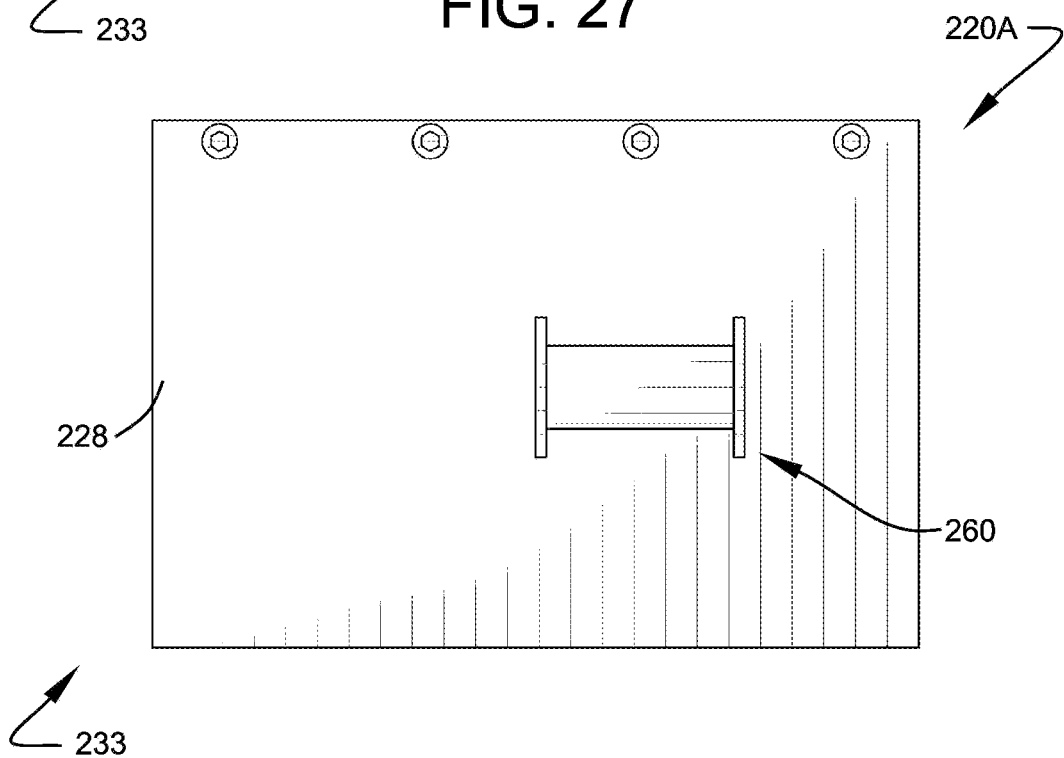
FIG. 28 shows a bottom view of the first collapsible cargo bin of FIG. 11 in the collapsed configuration.
Figure 29:
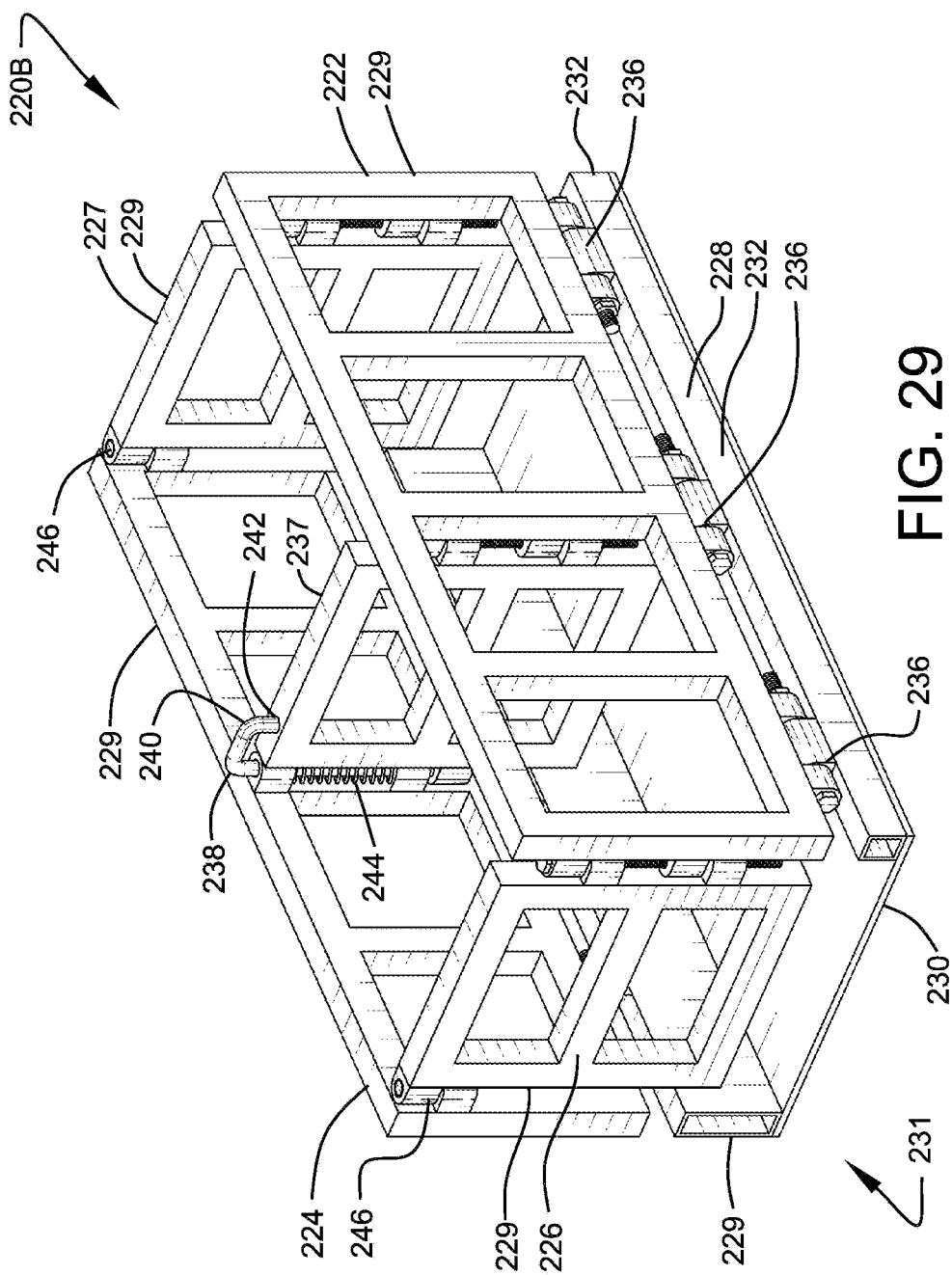
FIG. 29 shows an enlarged perspective view of the second collapsible cargo bin of FIG. 11.
Figure 34:
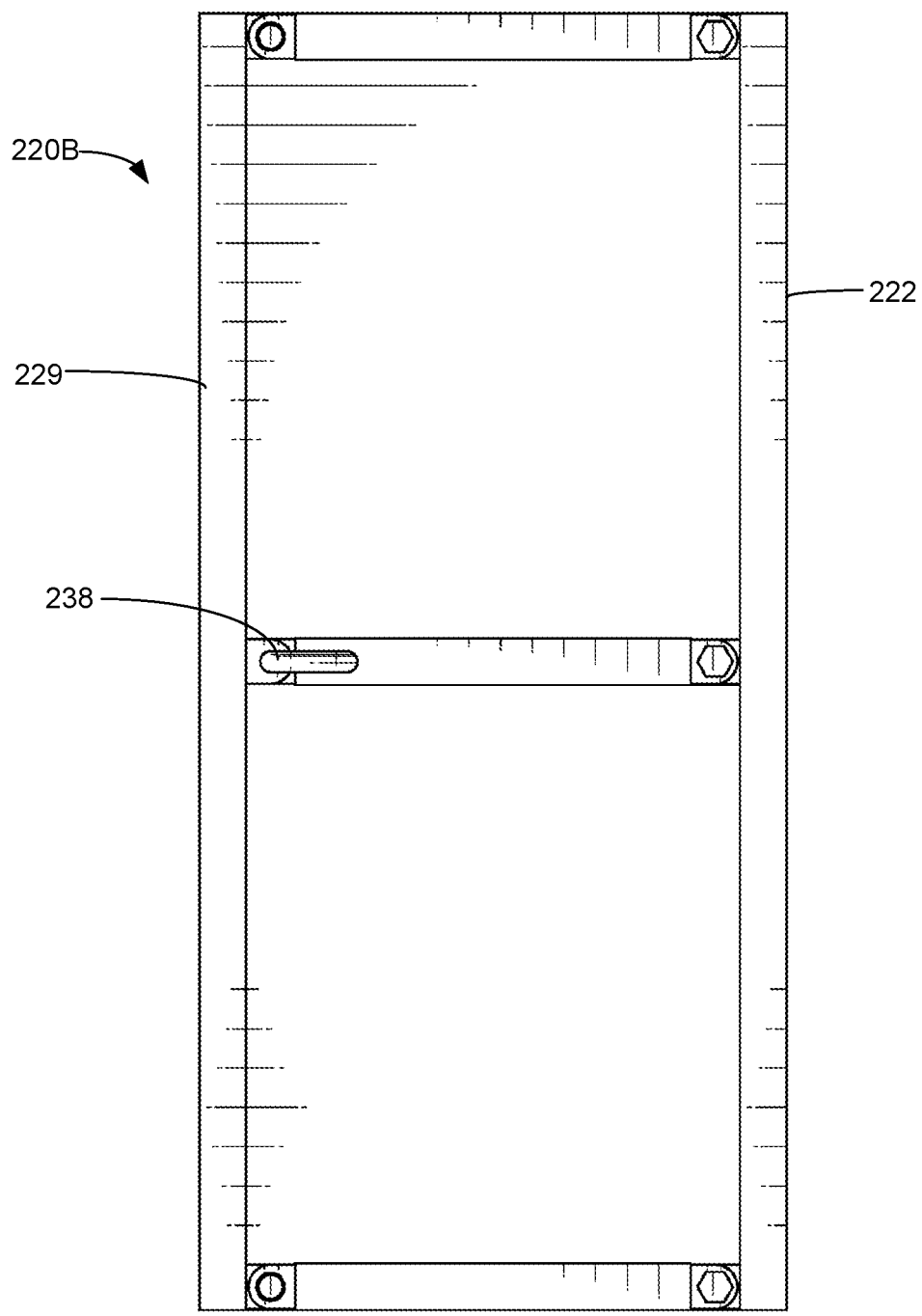
FIG. 34 shows a top view of the second collapsible cargo bin of FIG. 11.
Figure 35:
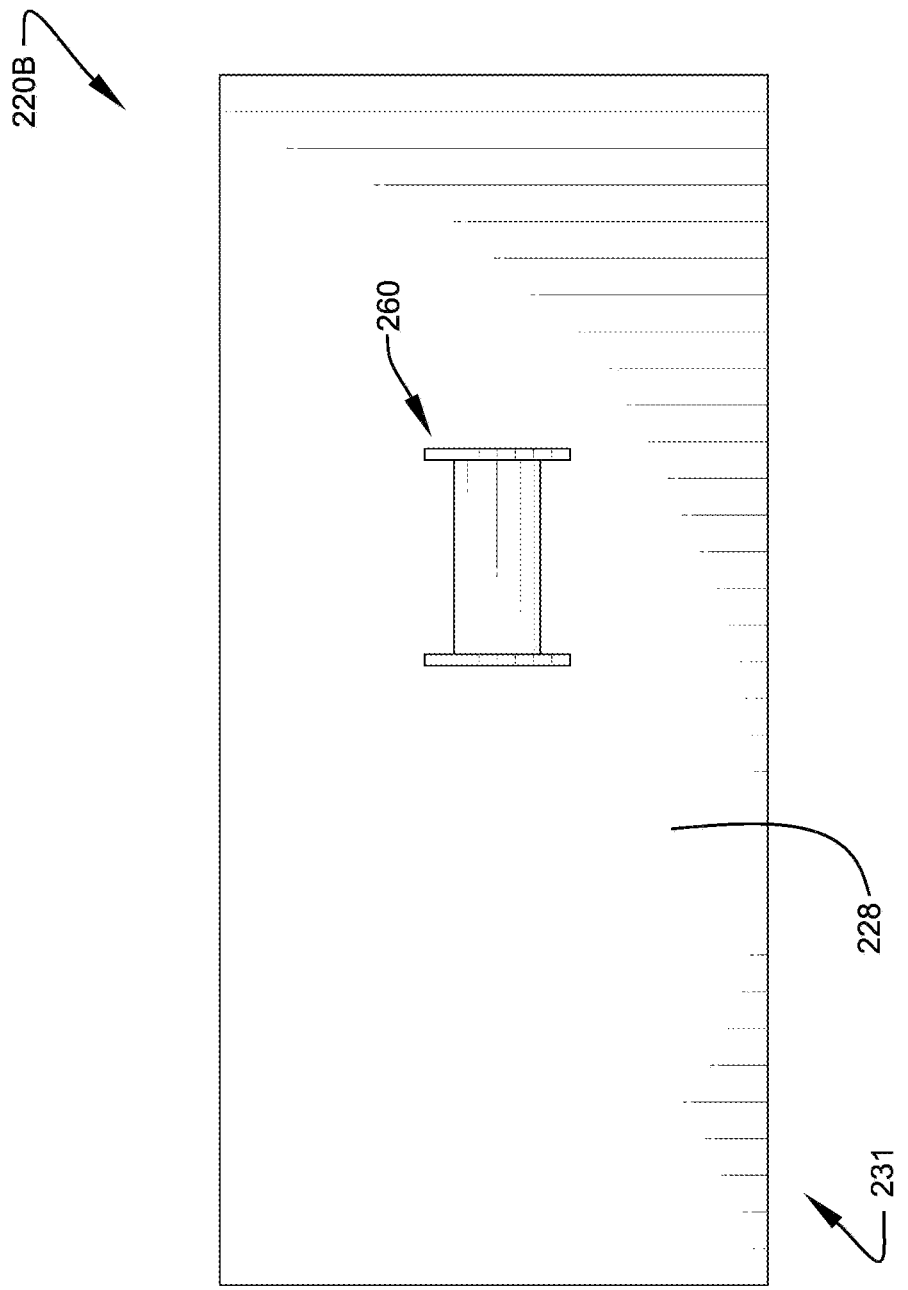
FIG. 35 shows a bottom view of the second collapsible cargo bin of FIG. 11.
Figure 36:
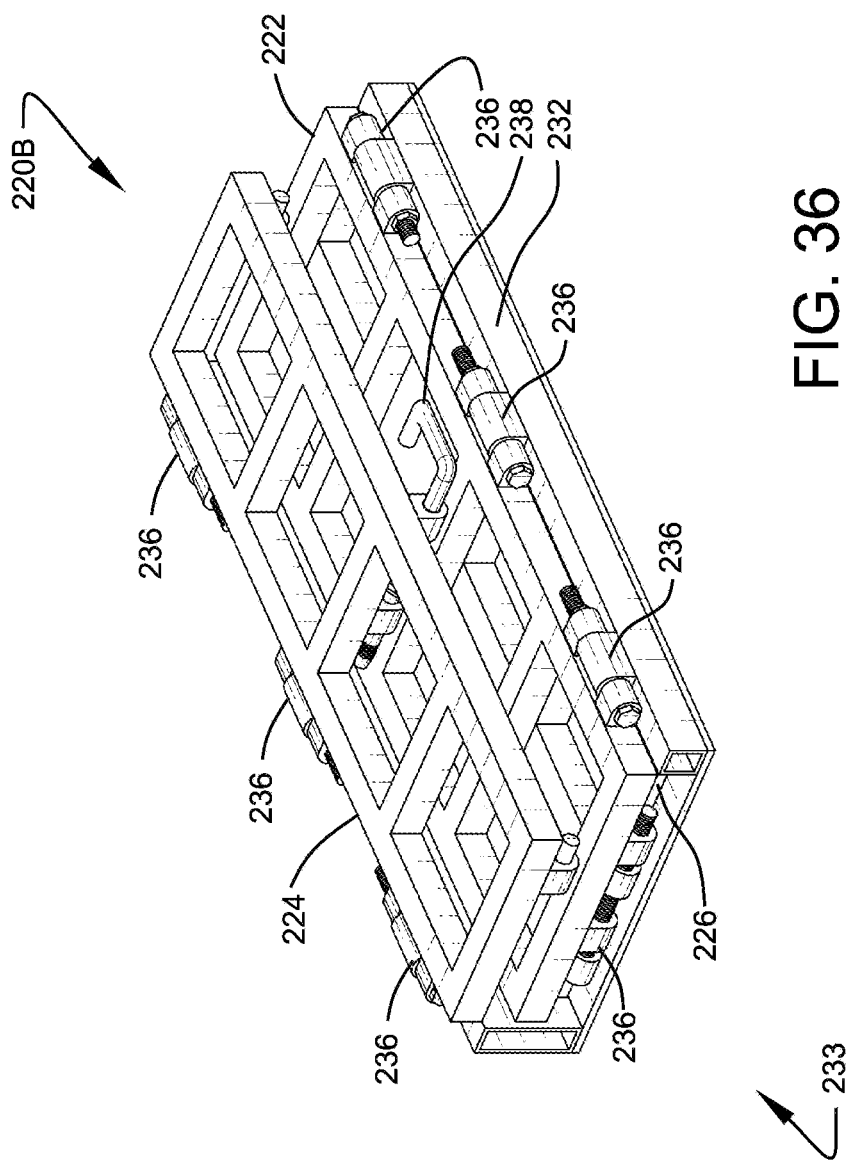
FIG. 36 shows a perspective view of the second collapsible cargo bin of FIG. 11 in a collapsed configuration.
Figure 39:
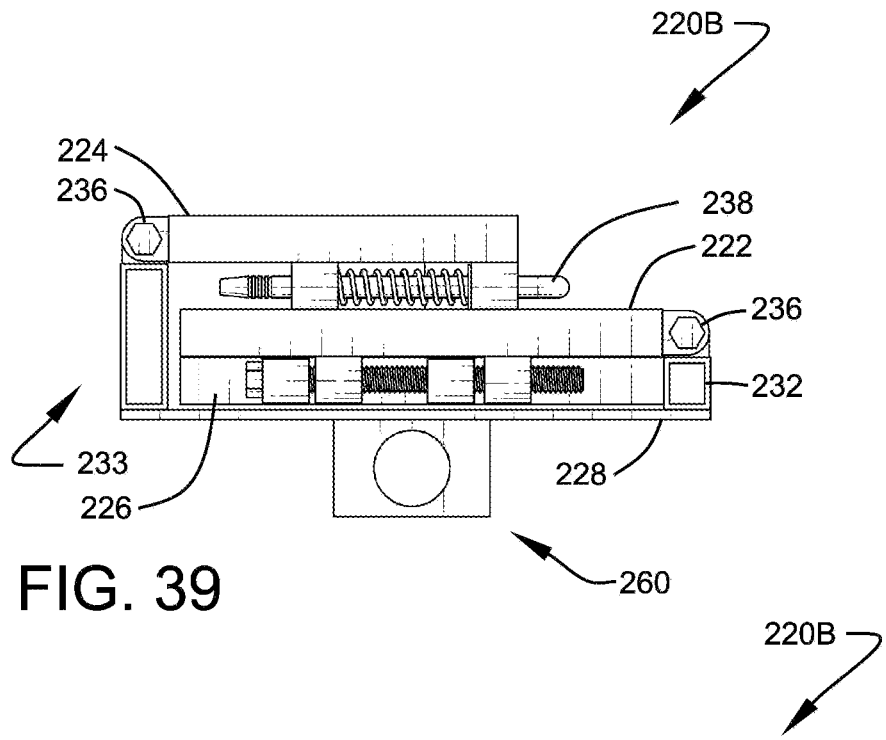
FIG. 39 shows a left-side view of the second collapsible cargo bin of FIG. 11 in the collapsed configuration.
Figure 40:
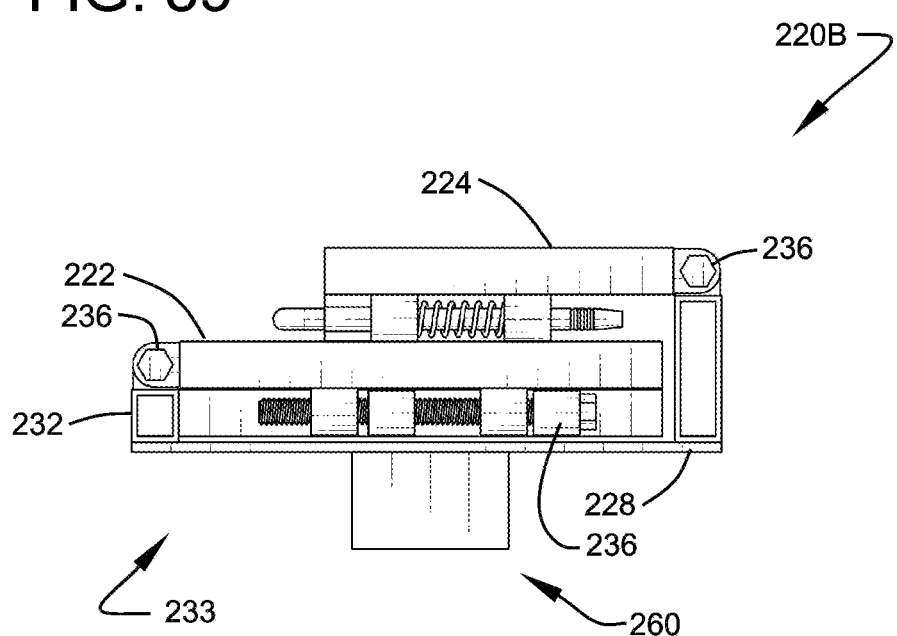
FIG. 40 shows a right-side view of the second collapsible cargo bin of FIG. 11 in the collapsed configuration.
Figure 41:
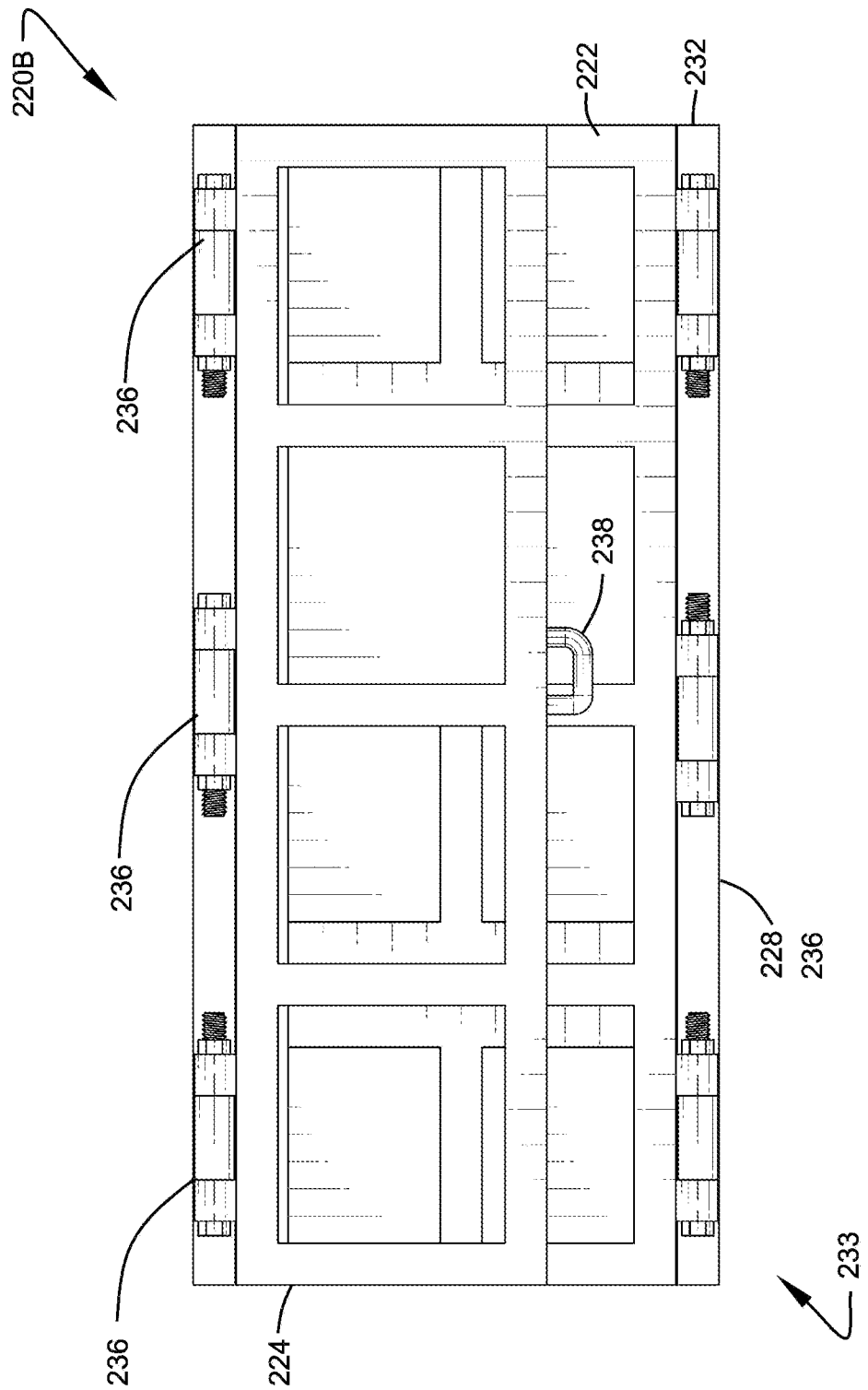
FIG. 41 shows a top view of the second collapsible cargo bin of FIG. 11 in the collapsed configuration.
Figure 42:
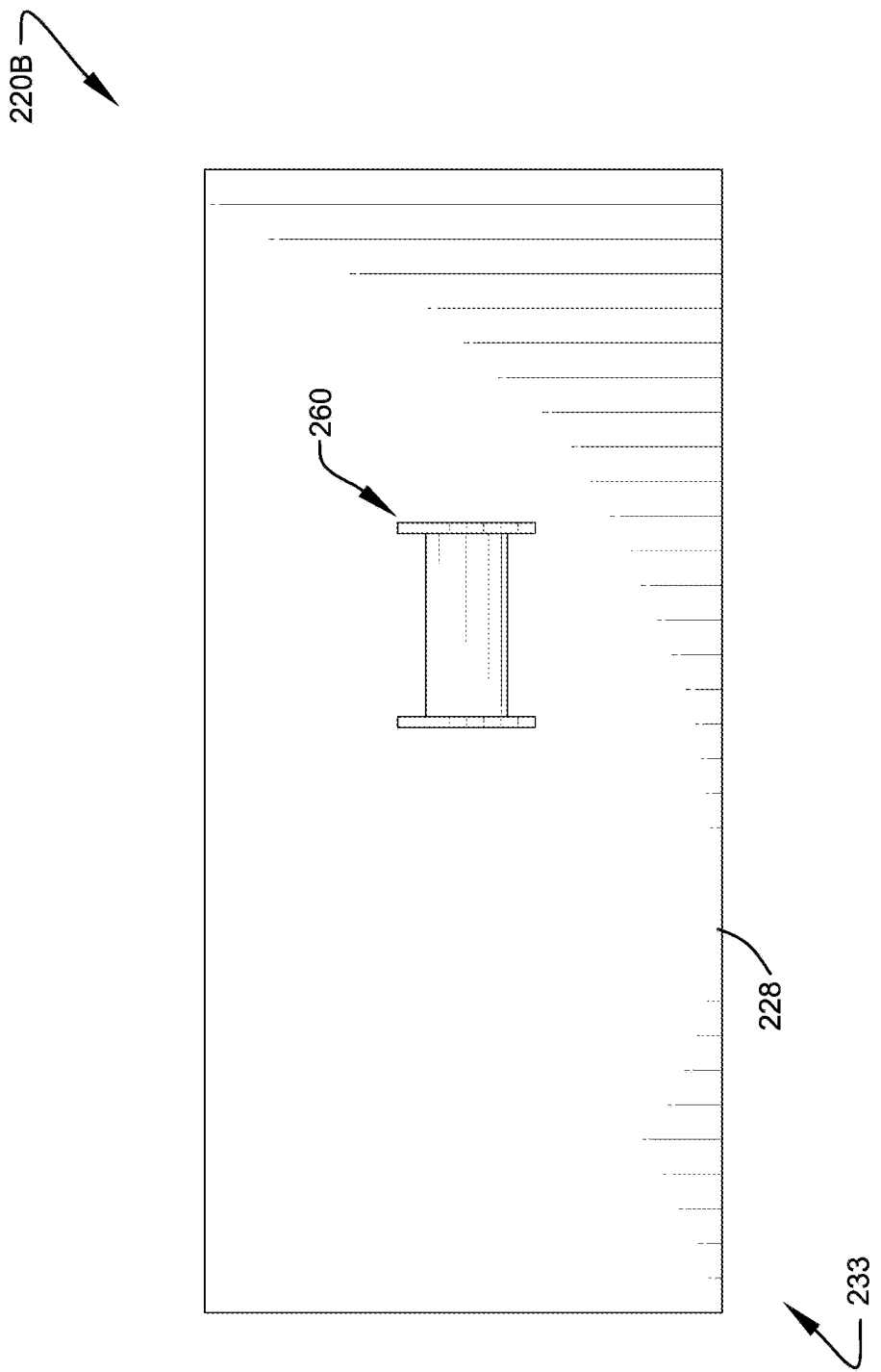
FIG. 42 shows a bottom view of the second collapsible cargo bin of FIG. 11 in the collapsed configuration.

FIG. 13 and FIG. 14 illustrate the second depicted size arrangement, identified herein as collapsible cargo bin 220B. The physical arrangements of collapsible cargo bin 220B enables the bin to hold two five-gallon gas tanks 221, as best illustrated in FIG. 14. Upon reading this specification, it should be appreciated that, under appropriate circumstances, considering such issues as user preferences, design preference, structural requirements, marketing preferences, cost, available materials, etc., other size arrangements such as, for example, larger or smaller bins, etc., may be sufficient.

FIG. 15 through FIG. 21 show various descriptive views of collapsible cargo bin 220A in a deployed configuration 231. FIG. 22 through FIG. 28 show a corresponding set of views of collapsible cargo bin 220A in collapsed configuration 233.

FIG. 29 through FIG. 35 show various descriptive views of the larger collapsible cargo bin 220B in a deployed configuration 231. FIG. 36 through FIG. 42 show a corresponding set of views of collapsible cargo bin 220B in a collapsed configuration 233.

Collapsible cargo bin 220A and the larger-capacity collapsible cargo bin 220B are of substantially similar arrangements, each one comprising front wall 222, rear wall 224, bottom wall 228, first side wall 226 and second side wall 227. Front wall 222 and rear wall 224 of each bin assembly comprise a rigid planar panel that is hingedly interconnected to bottom wall 228 of the collapsible cargo bin. First side wall 226 and second side wall 227 both comprise rigid planar panels that are hingedly connected to front wall 222 and releasably connected to rear wall 224.

Front wall 222, rear wall 224, bottom wall 228, first side wall 226 and second side wall 227 are each movable between deployed configuration 231, as shown in FIG. 15 through FIG. 21 and in FIG. 29 through FIG. 35 and a collapsed configuration 233, as shown in FIG. 22 through FIG. 28 and in FIG. 36 through FIG. 42. When arranged in deployed configuration 231, front wall 222 and rear wall 224 comprise coplanar orientations generally orthogonal to bottom wall 228. First side wall 226 and second side wall 227 both comprise coplanar orientations and are generally orthogonal to front wall 222, rear wall 224 and bottom wall 228, when arranged in deployed configuration 231. Front wall 222, rear wall 224, bottom wall 228, first side wall 226 and second side wall 227 together define a storage area when arranged in deployed configuration 231.

The larger collapsible cargo bin 220B also includes intermediate wall 237, as shown. Intermediate wall 237 is arranged in a coplanar orientation with first side wall 226 and second side wall 227 and is located at a position generally equidistant between the two. Intermediate wall 237 comprises a rigid planar panel that is hingedly connected to front wall 222 and releasably connected to rear wall 224. Intermediate wall 237 serves to divide a storage area into two separated compartments when collapsible cargo bin 220B is arranged in deployed configuration 231.

Both collapsible cargo bin 220A and collapsible cargo bin 220B may be folded into the flattened collapsed configuration 233 by releasing rear wall 224 from the transverse walls. In collapsible cargo bin 220A, rear wall 224 is decoupled from first side wall 226 and second side wall 227 allowing folding of first side wall 226 and second side wall 227 inwardly to positions parallel and adjacent to front wall 222. This allows front wall 222, first side wall 226 and second side wall 227 to be collapsed downwardly, about a hinged connection between front wall 222 and bottom wall 228, to rest over bottom wall 228, as shown in, for example, FIG. 22 and FIG. 36. In the case of collapsible cargo bin 220B, first side wall 226, second side wall 227 and intermediate wall 237 is released from rear wall 224 and folded inwardly to a position parallel and adjacent to front wall 222. In both versions, rear wall 224 is then collapsed downwardly, about a hinged connection between rear wall 224 and bottom wall 228, to a position over and parallel to front wall 222 and side walls 226 (and intermediate wall 237 in the case of collapsible cargo bin 220B). Thus, front wall 222, rear wall 224, bottom wall 228, first side wall 226, second side wall 227, and intermediate wall 237 each comprise substantially horizontal coplanar orientations when arranged to collapsed configuration 233.

Side walls 226, intermediate wall 237, bottom wall 228 and front wall 222 and rear wall 224 of each the bin assembly are all made from rigid rectangular members 229, preferably metallic tubes having a rectangular cross section, as shown. In one implementation of the present disclosure, rigid rectangular members 229 comprise steel tubes assembled by thermal welding.

The bottom wall 228 includes a base panel 230. Such compact nesting of the walls is facilitated by the arrangements of bottom wall 228. Base panel 230 of bottom wall 228 comprises a rigid rectangular plate having a pair of support rails located in a parallel relationship at its perimeter. A front support rail 232, comprising a rigid tubular member of rectangular cross section, extends along the length of the front perimeter edge. A corresponding rear support rail 234 (see FIG. 22), comprising a rigid tubular member of rectangular cross section, extends along the length of the rear perimeter edge, as shown. In the present disclosure, front support rail 232 and rear support rail 234 are rigidly attached to the upper surface 116 of base panel 230. In the present disclosure, rear support rail 234 is hingedly coupled to rear wall 224 and is thermally welded to base panel 230. Front support rail 232 is hingedly coupled to front wall 222 and is bolted to base panel 230, as shown.

Front support rail 232 is hingedly interconnected to front wall 222 by a set of hinge members 236, as shown. Front support rail 232 extends above the upper surface 116 of base panel a height H1 that is at least equal to the thickness of side walls 226 (and intermediate wall 237 for collapsible cargo bin 220B). This allows the side walls 226 (and intermediate wall 237) to rest in a nested position between bottom wall 228 and front wall 222 when front wall 222 is lowered to the collapsed condition shown in the above-referenced drawings.

Rear support rail 234 is hingedly interconnected to rear wall 224 by a similar set of hinge members 236, as shown. Rear support rail 234 extends above the upper surface 239 (see FIG. 20) of base panel a height H2 that is at least equal to the combined thickness of side walls 226 and front wall 222. This allows both the side walls, intermediate wall 237 for collapsible cargo bin 220B and front wall 222 to rest in a nested position between bottom wall 228 and rear wall 224 when rear wall 224 is lowered to the collapsed condition shown in the above-referenced drawings.

Each hinge member 236 comprises three sleeve sections having coaxial bores adapted to receive an elongate rod retained within the bores. In a preferred implementation of the present disclosure, the rod comprises a threaded bolt retained by a nut. The two end sleeves are welded (or otherwise coupled) to a selected frame member with the intermediate sleeve similarly coupled to an adjacent wall member, as shown. Once assembled, the end sleeves and intermediate sleeve may freely rotate about the rod, thus allowing the hinged frame members/walls to pivot relative to each other.

Collapsible cargo bin 220A and collapsible cargo bin 220B each preferably include an elongated locking bar 238 slidably connected to the inner face of rear wall 224 and having an upper hook portion 240 adapted to engage a receiving aperture 242 of an adjacent wall. In the case of collapsible cargo bin 220A, upper hook portion 240 is adapted to engage a receiving aperture 242 formed in the top surface of first side wall 226. In the case of collapsible cargo bin 220B, upper hook portion 240 is adapted to engage a receiving aperture 242 formed in the upper surface of intermediate wall 237. Locking bar 238 includes a spring 244 to bias the hook portion 240 toward a position of engagement with the receiving aperture 242.

Collapsible cargo bin 220A and collapsible cargo bin 220B comprise secondary retainer assemblies 246 provided to positionally retain the bins in the deployed configuration. In collapsible cargo bin 220A, a secondary retainer assembly 246 is provided to releasably retain rear wall 224 and second side wall 227, as shown. In collapsible cargo bin 220B a set of secondary retainer assemblies 246 are provided to releasably retain both first side wall 226 and second side wall 227 to rear wall 224.

The second retainer assembly 246 includes simple fixed pin supported by a projecting boss mounted to rear wall 224 along with a receiving aperture located in projecting boss of the side walls. The fixed pin and receiving aperture are cooperatively arranged so as to maintain the side wall in the deployed position during use, and allow for separation of the respective parts when locking bar 238 is disengaged and the adjoining walls are sufficiently adjusted toward their respective collapsed configurations.

Collapsible cargo bin 220A and collapsible cargo bin 220B each include a cargo bin receiver 260 enabling attachment of the bin assembly to trailer 102 by engagement with bin attachment point 110 of first elongate member 112 (see FIG. 2). A preferred arrangement of cargo bin receiver 260 includes a transverse receiver tube 262 mounted to the underside of bottom wall 228 using two opposing plates 264. One plate 264 has an opening 266 to receiver tube 262, thus forming a socket 268 adapted to receive the cylindrical tubular mount 128 projecting outwardly of first elongate member 112. Receiver tube 262 and cylindrical tubular mount 128 each comprise a pair of opposing apertures 270, thus allowing cargo bin receiver 260 to be held to tubular mount 128 using a removable pin or similar anchor.

According to one implementation, towable trailer system 100 may be arranged as a kit 300. In reference to FIG. 11, kit 300 may include trailer 102, one or more collapsible cargo bins 220, and a set of instructions 302. Instructions 302 may detail functional relationships in relation to the structure of towable trailer system 100 (such that the towable trailer system 100 can be used, maintained, or the like, in a preferred manner). Upon reading this specification, it should be appreciated that, under appropriate circumstances, considering such issues as user preferences, design preference, structural requirements, marketing preferences, cost, available materials, technological advances, etc., other kit arrangements such as, for example, providing tie-down straps, electrical harness adapters, storage bags, gas cans, etc., may be sufficient.

The implementations of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U. S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A towable trailer system, comprising:
a trailer vehicle adapted to be removably coupled to a towing vehicle, the trailer vehicle including
a hitch connecting assembly having
a first elongate member with a first end and a second end,
a hitch coupler arranged at the first end of the first elongate member and adapted to removably engage to a rear of the towing vehicle, and
a tubular mount coupled to the first elongate member and arranged between the first end and the second end,
a main body assembly removably coupled to the hitch connecting assembly and having
a pair of wheel assemblies movably supporting the trailer vehicle on a surface,
a second elongate member removably and telescopically coupled to the second end of the first elongated member, the second elongate member extends rearwardly from the first elongate member in a longitudinal direction,
a first cross bar engaged with and supported on the second elongate member and extending substantially perpendicularly to the second elongate member,
a second cross bar removably coupled to the pair of wheel assemblies and extending in a lateral direction between the pair of wheel assemblies, and
a third elongate member coupled to the second cross bar and extending in the longitudinal direction from the second crossbar to the second elongate member and removably engaged with the second elongate member; and
a cargo bin configured to hold a cargo and adapted to be removably coupled with the trailer vehicle, the cargo bin is adapted to be arranged in a deployed configuration and a collapsed configuration, the cargo bin including
a bottom wall,
a front wall and a rear wall, each hingedly connected to the bottom wall,
a first side wall and a second side wall, each hingedly connected to the front wall, wherein
in the deployed configuration, the front wall, the rear wall, the first side wall, and the second side wall are arranged orthogonally to the bottom wall defining a storage area of the cargo bin therebetween, and
in the collapsed configuration, the front wall, the rear wall, the first side wall, and the second side wall are arranged parallel to the bottom wall and are supported on the bottom wall, and
a cargo bin receiver removably engaged with the tubular mount to facilitate the coupling of the cargo bin with the trailer vehicle; and
wherein the cargo bin includes an elongated locking bar slidably connected to an inner face of the rear wall and having an upper hook portion adapted to engage a receiving aperture of an adjacent arranged wall.

2. The towable trailer system of claim 1, wherein the tubular mount extends outwardly of the first elongate member in the lateral direction.

3. The towable trailer system of claim 1, wherein the main body assembly includes a pair of diagonal braces extending from the third elongate member to the second crossbar and are arranged on opposite sides of the third elongate member.

4. The towable trailer system of claim 1, wherein the first elongate member includes at least one bend to arrange the hitch coupler at an elevated position relative to the second end of the first elongate member when the hitch coupler is coupled to the towing vehicle.

5. The towable trailer system of claim 1, wherein the cargo bin receiver is arranged underside of the bottom wall and is coupled to the bottom wall.

6. The towable trailer system of claim 5, wherein the cargo bin receiver includes a transverse receiver tube mounted to the underside of the bottom wall via two opposing plates defining a socket to receive the tubular mount.

7. The towable trailer system of claim 6, wherein the transverse receiver tube and the tubular mount each includes a pair of opposing apertures to receive a pin to secure the tubular mount within the receiver tube.

8. The towable trailer system of claim 1, wherein the cargo bin includes a spring to bias the upper hook portion toward a position of engagement with the receiving aperture.

9. The towable trailer system of claim 1, the adjacent wall is the first side wall, and the elongated locking bar releasably couple the first sidewall with the rear wall in the deployed configuration.

10. The towable trailer system of claim 1, wherein the cargo bin includes a retainer assembly for releasably coupling the first sidewall and/or the second sidewall with the rear wall in the deployed configuration of the cargo bin.

11. The towable trailer system of claim 1, wherein the cargo bin includes an intermediate wall hingedly coupled to the front wall and is arranged between the first side wall and the second side wall, wherein the intermediate wall is arranged orthogonally from the bottom wall and extends between the front wall and the rear wall in the deployed configuration of the cargo bin, wherein the intermediate wall is arranged parallel to the bottom wall in the collapsed configuration, and wherein the adjacent wall is the intermediate wall, and the locking bar releasably couple the intermediate wall with the rear wall in the deployed configuration.

12. The towable trailer system of claim 1, wherein the bottom wall includes a base panel, a front support rail attached to an upper surface of the base panel and extending along a length of a front perimeter edge of the base panel, and a rear support rail attached to an upper surface of the base panel and extending along a length of a rear perimeter edge of the base panel, wherein the front wall is hinged to the front support rail and the rear wall is hinged to the rear support rail.

13. The towable trailer system of claim 12, wherein a height of the front support rail is at least equal to thickness of the first sidewall or the second sidewall, and a height of the rear support is greater than the height of the rear support rail and is at least equal to a combined thickness of the one of the sidewalls and the front wall.

* * * * *